US012456521B2

(12) United States Patent
Ohaga et al.

(10) Patent No.: US 12,456,521 B2
(45) Date of Patent: Oct. 28, 2025

(54) SUB-BLOCK SEPARATION IN NAND MEMORY THROUGH WORD LINE BASED SELECTORS

(71) Applicant: Sandisk Technologies, Inc., Milpitas, CA (US)

(72) Inventors: Motoo Ohaga, Nagoya (JP); Shinsuke Yada, Nagoya (JP); Naohiro Hosoda, Asachi-cho (JP); Hiroyuki Ogawa, Nagoya (JP)

(73) Assignee: Sandisk Technologies, Inc., Milpitas, CA (US)

( * ) Notice: Subject to any disclaimer, the term of this patent is extended or adjusted under 35 U.S.C. 154(b) by 273 days.

(21) Appl. No.: 18/499,797

(22) Filed: Nov. 1, 2023

(65) Prior Publication Data

US 2025/0140318 A1    May 1, 2025

(51) Int. Cl.
  *G11C 16/04* (2006.01)
  *G11C 16/08* (2006.01)
  *G11C 16/10* (2006.01)
  *G11C 16/26* (2006.01)

(52) U.S. Cl.
  CPC ........ *G11C 16/102* (2013.01); *G11C 16/0433* (2013.01); *G11C 16/08* (2013.01); *G11C 16/26* (2013.01)

(58) Field of Classification Search
  CPC .................................................. G11C 16/0483
  See application file for complete search history.

(56) References Cited

U.S. PATENT DOCUMENTS

| 9,093,160 | B1 | 7/2015 | Ellis et al. |
| 9,213,355 | B2 | 12/2015 | Caruk et al. |
| 10,254,967 | B2 | 4/2019 | Ouyang et al. |
| 10,381,095 | B1 * | 8/2019 | Date ..................... G11C 16/16 |

OTHER PUBLICATIONS

Notice of Allowance dated Aug. 1, 2025, U.S. Appl. No. 18/431,582, filed Feb. 2, 2024.
U.S. Appl. No. 18/467,005, filed Sep. 14, 2023.

* cited by examiner

*Primary Examiner* — Jason Lappas
(74) *Attorney, Agent, or Firm* — Pearl Cohen Zedek Latzer Baratz LLP

(57) ABSTRACT

As block sizes in NAND memory continue to increase in size and density, in can be useful to access less than all of the block, such as sub-block or subset of the blocks NAND strings, in order to reduce read disturbs, reduce power consumption, and increase operating speeds. Although this sort of separation of sub-block can be achieved by independently biasable select gates, the sort of select gate structure can face processing difficulties, particularly at the source side of three dimensional NAND structures. To avoid these difficulties while still providing individually selectable sub-blocks, the following introduces word line based selectors, where multiple word lines of a blocks are programmed with different sets of threshold voltages, allowing them to be biased for individual access of sub-blocks.

20 Claims, 28 Drawing Sheets

Figure 7A
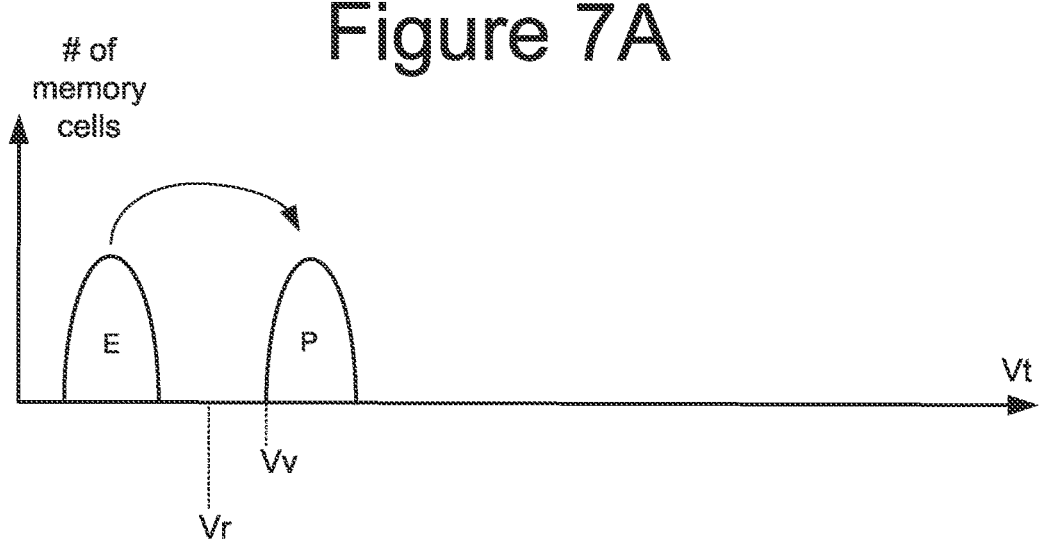
Figure 7B
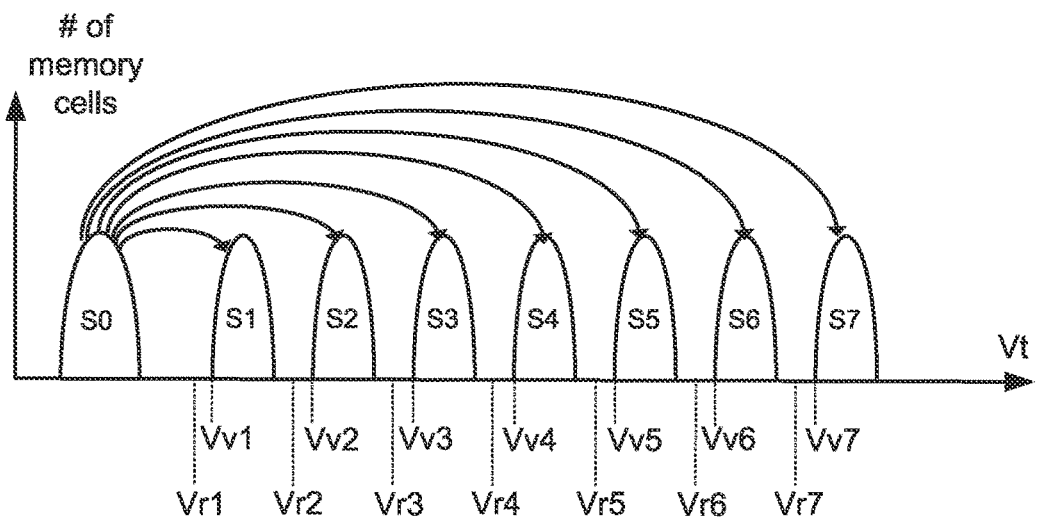
Figure 7C
|  | S0 | S1 | S2 | S3 | S4 | S5 | S6 | S7 |
| --- | --- | --- | --- | --- | --- | --- | --- | --- |
| Upper Page | 1 | 1 | 1 | 0 | 0 | 0 | 0 | 1 |
| Middle Page | 1 | 1 | 0 | 0 | 1 | 1 | 0 | 0 |
| Lower Page | 1 | 0 | 0 | 0 | 0 | 1 | 1 | 1 |

| | SS Vth setting | | | | | SS bias voltage setting | | | | |
|---|---|---|---|---|---|---|---|---|---|---|
| | finger0 | finger1 | finger2 | finger3 | finger4 | finger0 select | finger1 select | finger2 select | finger3 select | finger4 select |
| SS4 | Vth_high | Vth_high | Vth_high | Vth_high | Vth_low | VH | VH | VH | VH | VL |
| SS3 | Vth_high | Vth_high | Vth_high | Vth_low | Vth_high | VH | VH | VH | VL | VH |
| SS2 | Vth_high | Vth_high | Vth_low | Vth_high | Vth_high | VH | VH | VL | VH | VH |
| SS1 | Vth_high | Vth_low | Vth_high | Vth_high | Vth_high | VH | VL | VH | VH | VH |
| SS0 | Vth_low | Vth_high | Vth_high | Vth_high | Vth_high | VL | VH | VH | VH | VH |

VH > Vth_high > VL > Vth_low

| case | SS | SS bias voltage | finger0 Vth | finger1 Vth | finger2 Vth | finger3 Vth | finger4 Vth |
|---|---|---|---|---|---|---|---|
| finger0 select | SS1 | V0 | Vth0 | Vth1 | Vth2 | Vth3 | Vth4 |
|  | SS0 | V4 | Vth4 | Vth3 | Vth2 | Vth1 | Vth0 |
| finger1 select | SS1 | V1 | Vth0 | Vth1 | Vth2 | Vth3 | Vth4 |
|  | SS0 | V3 | Vth4 | Vth3 | Vth2 | Vth1 | Vth0 |
| finger 2 select | SS1 | V2 | Vth0 | Vth1 | Vth2 | Vth3 | Vth4 |
|  | SS0 | V2 | Vth4 | Vth3 | Vth2 | Vth1 | Vth0 |
| finger3 select | SS1 | V3 | Vth0 | Vth1 | Vth2 | Vth3 | Vth4 |
|  | SS0 | V1 | Vth4 | Vth3 | Vth2 | Vth1 | Vth0 |
| finger4 select | SS1 | V4 | Vth0 | Vth1 | Vth2 | Vth3 | Vth4 |
|  | SS0 | V0 | Vth4 | Vth3 | Vth2 | Vth1 | Vth0 |

V4 > Vth4 > V3 > Vth3 > V2 > Vth2 > V1 > Vth1 > V0 > Vth0     Bold = ON

SUB-BLOCK SEPARATION IN NAND MEMORY THROUGH WORD LINE BASED SELECTORS

BACKGROUND

The present disclosure relates to technology for non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery). An example of non-volatile memory is flash memory (e.g., NAND-type and NOR-type flash memory). Users of non-volatile memory typically want the memory to operate at high speeds so that they do not need to wait for memory operations to be completed.

BRIEF DESCRIPTION OF THE DRAWINGS

Like-numbered elements refer to common components in the different figures.

FIG. 7A depicts threshold voltage distributions of memory cells in a binary embodiment.

FIG. 7B depicts threshold voltage distributions of memory cells in a multi-level cell (MLC) embodiment.

FIG. 7C is a table describing one example of an assignment of data values to data states.

FIGS. 18 and 19 illustrate embodiments using a single level source side finger select word lines for source side separation of finger biasing.

FIGS. 20 and 21 illustrate embodiments using multi-level source side finger select word lines for source side separation of finger biasing.

DETAILED DESCRIPTION

As blocks in NAND memory continue to increase in size and density, in can be useful to access less than all of the block, such as a sub-block or subset of the blocks NAND strings, in order to reduce read disturbs, reduce power consumption, and increase operating speeds. Although this sort of separation of sub-block can be achieved by independently biasable select gates, this sort of select gate structure can face processing difficulties, particularly at the source side of three dimensional NAND structures. To avoid these difficulties while still providing individually selectable sub-blocks, the following introduces word line based selectors, where multiple word lines of a blocks are programmed with different sets of threshold voltages, allowing them to be biased for individual access of sub-blocks.

FIGS. 1A-6E describe one example of a storage system that can be used to implement the technology disclosed herein.

Figure 1A:
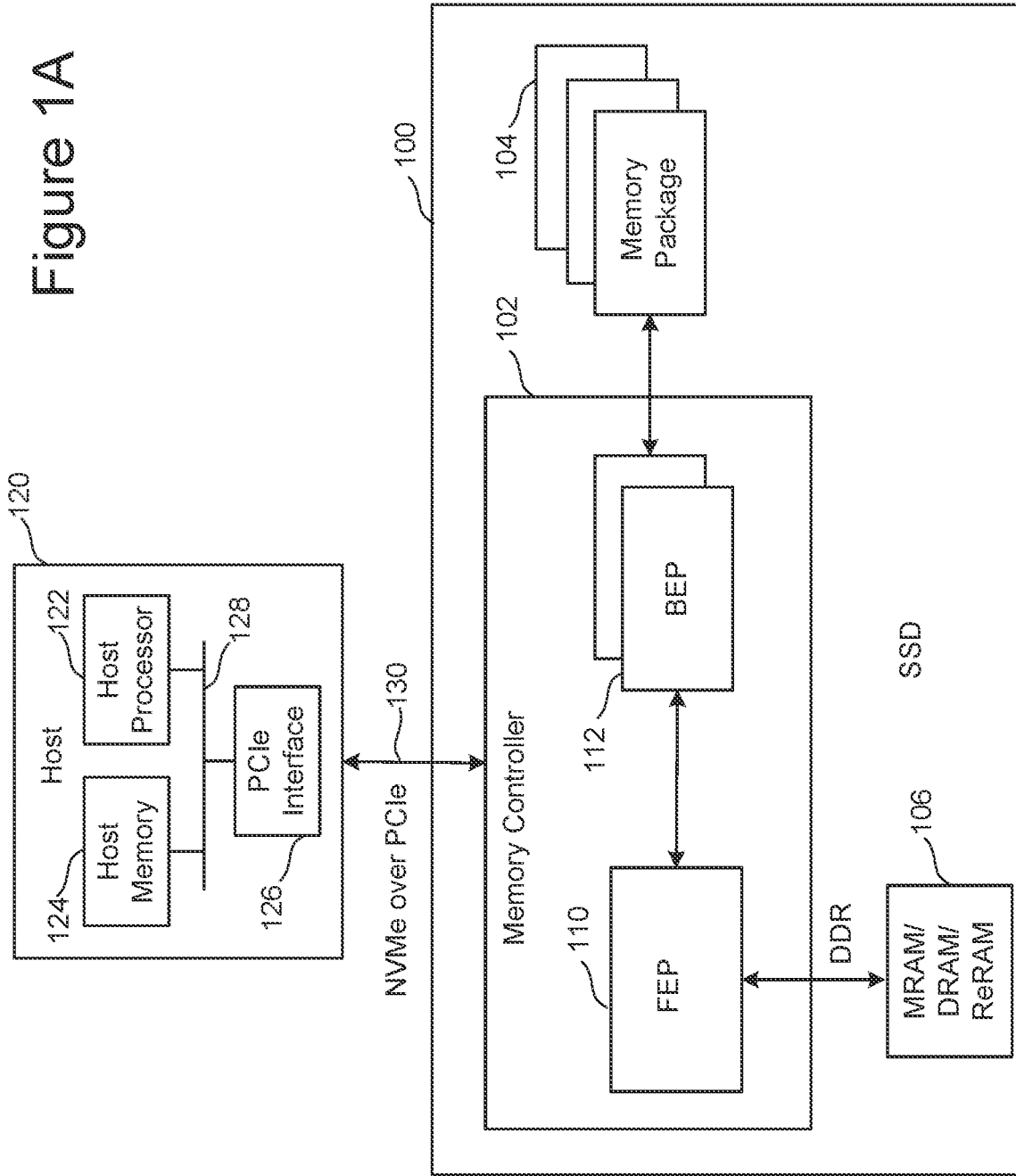
FIG. 1A is a block diagram of one embodiment of a storage system connected to a host.

FIG. 1A is a block diagram of one embodiment of a storage system 100 connected to a host system 120. Storage system 100 can implement the technology disclosed herein. Many different types of storage systems can be used with the technology disclosed herein. One example storage system is a solid state drive ("SSD"); however, other types of storage systems can also be used. Storage system 100 comprises a memory controller 102, memory package 104 for storing data, and local memory (e.g., MRAM/DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory package 104 at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Memory controller 102 is one example of a control circuit.

In one embodiment, there are a plurality of memory packages 104. Each memory package 104 may contain one or more memory dies. In one embodiment, each memory die in the memory package 104 utilizes NAND flash memory (including two dimensional NAND flash memory and/or three dimensional NAND flash memory). In other embodiments, the memory package 104 can include other types of memory; for example, the memory package can include Phase Change Memory (PCM) memory.

In one embodiment, memory controller 102 communicates with host system 120 using an interface 130 that implements NVM Express (NVMe) over PCI Express (PCIe). For working with storage system 100, host system 120 includes a host processor 122, host memory 124, and a PCIe interface 126, which communicate over bus 128. Host memory 124 is the host's physical memory, and can be DRAM, SRAM, non-volatile memory or another type of storage. Host system 120 is external to and separate from storage system 100. In one embodiment, storage system 100 is embedded in host system 120. In other embodiments, the controller 102 may communicate with host 120 via other types of communication buses and/or links, including for example, over an NVMe over Fabrics architecture, or a cache/memory coherence architecture based on Cache Coherent Interconnect for Accelerators (CCIX), Compute Express Link (CXL), Open Coherent Accelerator Processor Interface (OpenCAPI), Gen-Z and the like. For simplicity, the example embodiments below will be described with respect to a PCIe example.

Figure 1B:
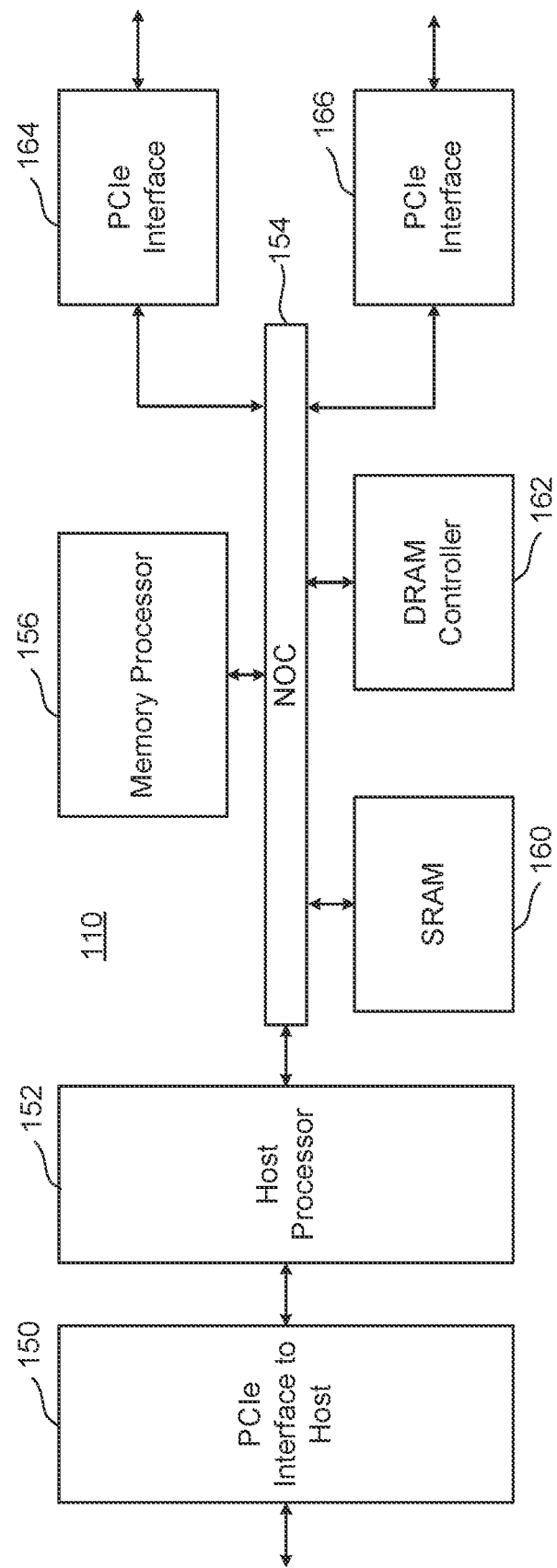
FIG. 1B is a block diagram of one embodiment of a Front End Processor Circuit.

FIG. 1B is a block diagram of one embodiment of FEP circuit 110. FIG. 1B shows a PCIe interface 150 to communicate with host system 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use un-clocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the local memory 106 (e.g., DRAM/MRAM/ReRAM). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, memory controller 102 includes two BEP circuits 112; therefore, there are two PCIe Interfaces 164/166. Each PCIe Interface communicates with one of the BEP circuits 112. In other embodiments, there can be more or fewer than two BEP circuits 112; therefore, there can be more than two PCIe Interfaces.

Figure 2A:
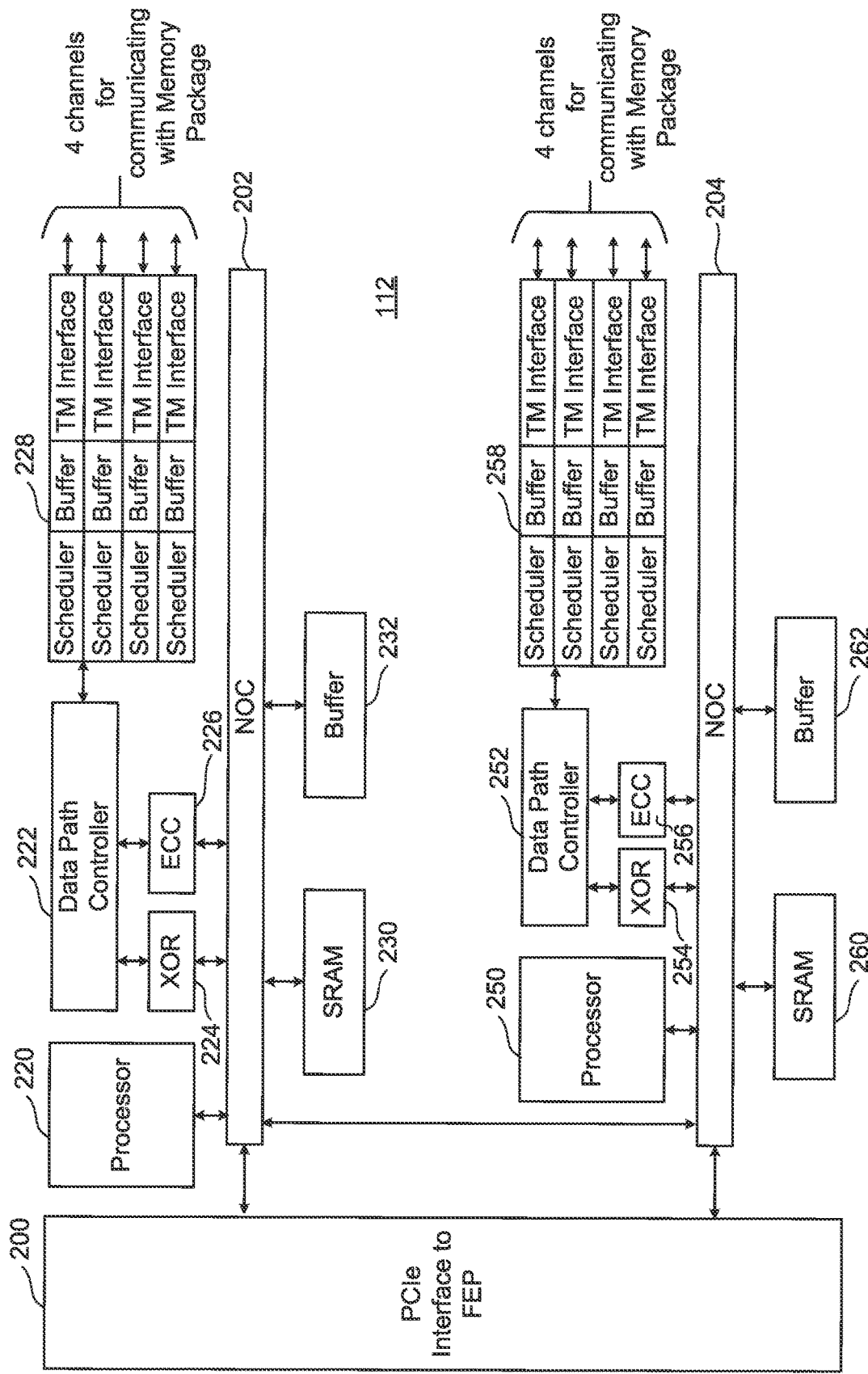
FIG. 2A is a block diagram of one embodiment of a Back End Processor Circuit.

FIG. 2A is a block diagram of one embodiment of the BEP circuit 112. FIG. 2A shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256).

The ECC engines 226/256 are used to perform error correction, as known in the art. Herein, the ECC engines 226/256 may be referred to as controller ECC engines. The XOR engines 224/254 are used to XOR the data so that data can be combined and stored in a manner that can be recovered in case there is a programming error. In an embodiment, the XOR engines 224/254 are able to recover data that cannot be decoded using ECC engine 226/256.

Data path controller 222 is connected to a memory interface 228 for communicating via four channels with integrated memory assemblies. Thus, the top NOC 202 is associated with memory interface 228 for four channels for communicating with integrated memory assemblies and the bottom NOC 204 is associated with memory interface 258 for four additional channels for communicating with integrated memory assemblies. In one embodiment, each memory interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254, ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 2A. Additionally, controllers with structures different than FIGS. 1B and 2A can also be used with the technology described herein.

Figure 2B:
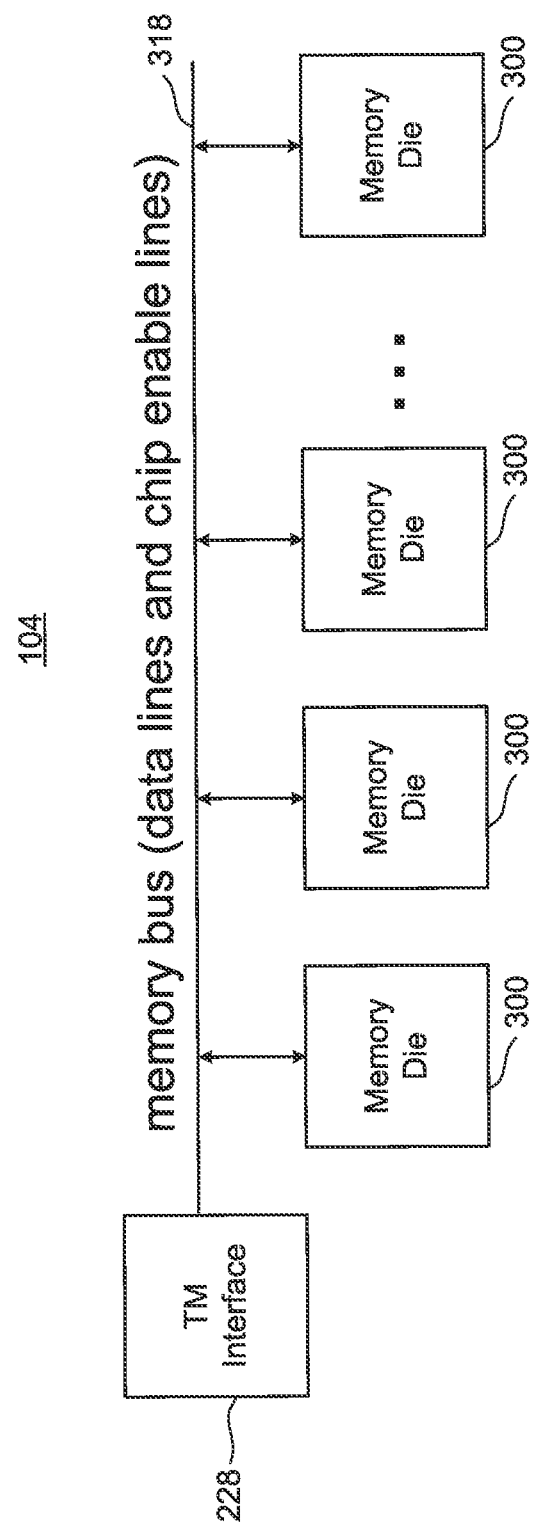
FIG. 2B is a block diagram of one embodiment of a memory package.

FIG. 2B is a block diagram of one embodiment of a memory package 104 that includes a plurality of memory dies 300 connected to a memory bus (data lines and chip enable lines) 318. The memory bus 318 connects to a Toggle Mode Interface 228 for communicating with the TM Interface of a BEP circuit 112 (see e.g., FIG. 2A). In some embodiments, the memory package can include a small controller connected to the memory bus and the TM Interface. In total, the memory package 104 may have eight or sixteen memory die; however, other numbers of memory die can also be implemented. The technology described herein is not limited to any particular number of memory die. In some embodiments, the memory package can also include a processor, CPU device, such as a RISC-V CPU along with some amount of RAM to help implement some of capabilities described below. The technology described herein is not limited to any particular number of memory die.

Figure 3A:
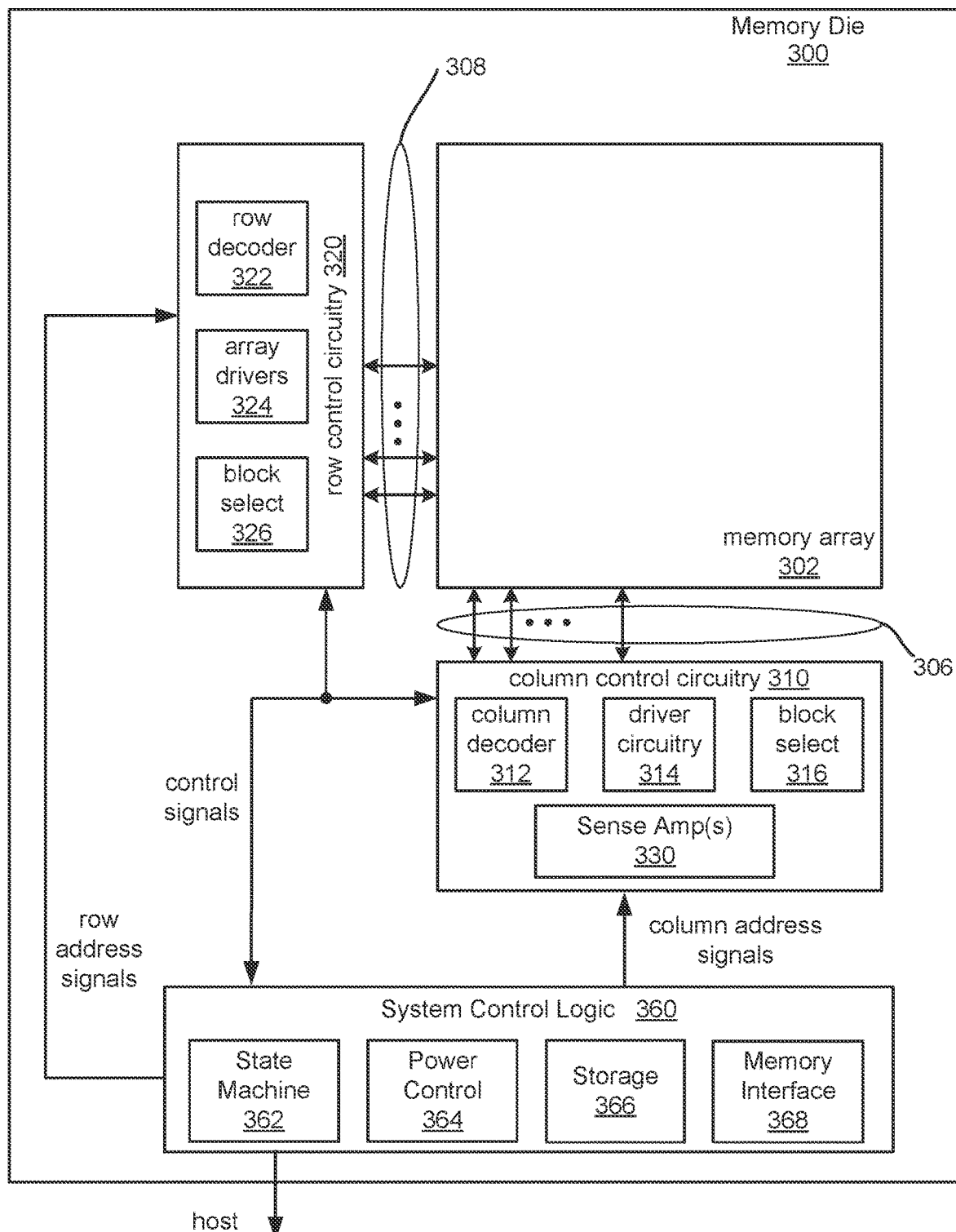
FIG. 3A is a functional block diagram of an embodiment of a memory die.

FIG. 3A is a block diagram that depicts one example of a memory die 300 that can implement the technology described herein. Memory die 300, which can correspond to one of the memory die 300 of FIG. 2B, includes a memory array 302 that can include any of memory cells described in the following. The array terminal lines of memory array 302 include the various layer(s) of word lines organized as rows, and the various layer(s) of bit lines organized as columns. However, other orientations can also be implemented. Memory die 300 includes row control circuitry 320, whose outputs 308 are connected to respective word lines of the memory array 302. Row control circuitry 320 receives a group of M row address signals and one or more various control signals from System Control Logic circuit 360, and typically may include such circuits as row decoders 322, array terminal drivers 324, and block select circuitry 326 for both reading and writing operations. Row control circuitry 320 may also include read/write circuitry. Memory die 300 also includes column control circuitry 310 including sense amplifier(s) 330 whose input/outputs 306 are connected to respective bit lines of the memory array 302. Although only a single block is shown for array 302, a memory die can include multiple arrays that can be individually accessed. Column control circuitry 310 receives a group of N column address signals and one or more various control signals from System Control Logic 360, and typically may include such circuits as column decoders 312, array terminal receivers or drivers 314, block select circuitry 316, as well as read/write circuitry, and I/O multiplexers.

System control logic 360 receives data and commands from a host and provides output data and status to the host. In other embodiments, system control logic 360 receives data and commands from a separate controller circuit and provides output data to that controller circuit, with the controller circuit communicating with the host. In some embodiments, the system control logic 360 can include a state machine 362 that provides die-level control of memory operations. In one embodiment, the state machine 362 is programmable by software. In other embodiments, the state machine 362 does not use software and is completely implemented in hardware (e.g., electrical circuits). In another embodiment, the state machine 362 is replaced by a micro-controller or microprocessor, either on or off the memory chip. The system control logic 360 can also include a power control module 364 controls the power and voltages supplied to the rows and columns of the memory 302 during memory operations and may include charge pumps and regulator circuit for creating regulating voltages. System control logic 360 includes storage 366, which may be used to store parameters for operating the memory array 302.

Commands and data are transferred between the controller 102 and the memory die 300 via memory controller interface 368 (also referred to as a "communication interface"). Memory controller interface 368 is an electrical interface for communicating with memory controller 102. Examples of memory controller interface 368 include a Toggle Mode Interface and an Open NAND Flash Interface (ONFI). Other I/O interfaces can also be used. For example, memory controller interface 368 may implement a Toggle Mode Interface that connects to the Toggle Mode interfaces of memory interface 228/258 for memory controller 102. In one embodiment, memory controller interface 368 includes a set of input and/or output (I/O) pins that connect to the controller 102.

In some embodiments, all of the elements of memory die 300, including the system control logic 360, can be formed as part of a single die. In other embodiments, some or all of the system control logic 360 can be formed on a different die.

For purposes of this document, the phrase "one or more control circuits" can include a controller, a state machine, a micro-controller, micro-processor, and/or other control circuitry as represented by the system control logic 360, or other analogous circuits that are used to control non-volatile memory.

In one embodiment, memory structure 302 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping.

In another embodiment, memory structure 302 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 302 is not limited to the examples above. Many different types of memory array architectures or memory technologies can be used to form memory structure 302. No particular non-volatile memory technology is required for purposes of the new claimed embodiments proposed herein. Other examples of suitable technologies for memory cells of the memory structure 302 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 302 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 3A can be grouped into two parts, the structure of memory structure 302 of the memory cells and the peripheral circuitry, including all of the other elements. An important characteristic of a memory circuit is its capacity, which can be increased by increasing the area of the memory die of memory system 100 that is given over to the memory structure 302; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 360, reduced availability of area can limit the available functionalities that can be implemented on-chip. Consequently, a basic trade-off in the design of a memory die for the memory system 100 is the amount of area to devote to the memory structure 302 and the amount of area to devote to the peripheral circuitry.

Another area in which the memory structure 302 and the peripheral circuitry are often at odds is in the processing involved in forming these regions, since these regions often involve differing processing technologies and the trade-off in having differing technologies on a single die. For example, when the memory structure 302 is NAND flash, this is an NMOS structure, while the peripheral circuitry is often CMOS based. For example, elements such sense amplifier circuits, charge pumps, logic elements in a state machine, and other peripheral circuitry in system control logic 360 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 3A onto separately formed dies that are then bonded together. More specifically, the memory structure 302 can be formed on one die and some or all of the peripheral circuitry elements, including one or more control circuits, can be formed on a separate die. For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 3B:
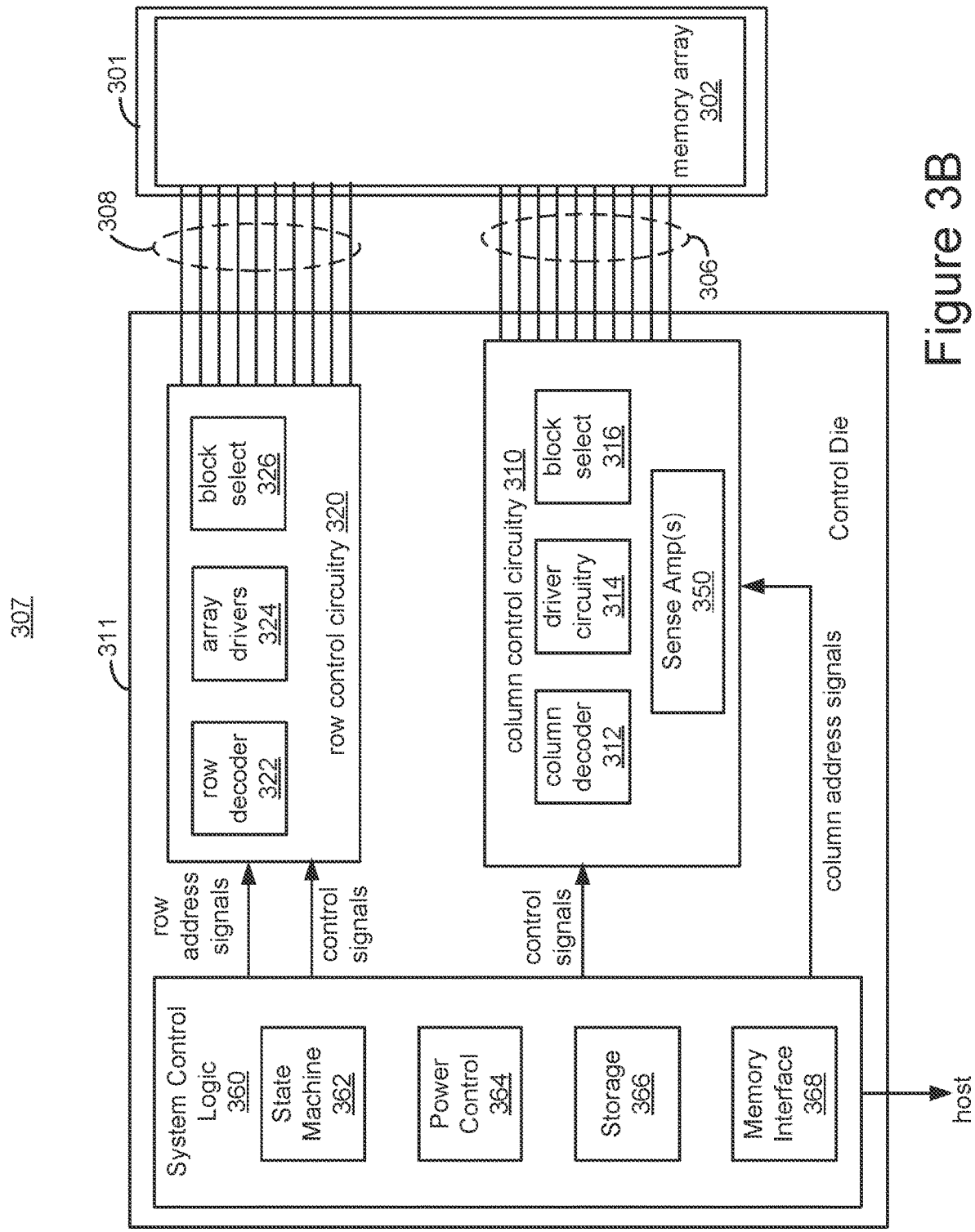
FIG. 3B is a functional block diagram of an embodiment of an integrated memory assembly.

FIG. 3B shows an alternative arrangement to that of FIG. 3A which may be implemented using wafer-to-wafer bonding to provide a bonded die pair. FIG. 3B depicts a functional block diagram of one embodiment of an integrated memory assembly 307. The integrated memory assembly 307 may be used in a memory package 104 in storage system 100. The integrated memory assembly 307 includes two types of semiconductor die (or more succinctly, "die"). Memory structure die 301 includes memory structure 302. Memory structure 302 may contain non-volatile memory cells. Control die 311 includes control circuitry 360, 310, 320. In some embodiments, the control die 311 is configured to connect to the memory structure 302 in the memory structure die 301. In some embodiments, the memory structure die 301 and the control die 311 are bonded together.

FIG. 3B shows an example of the peripheral circuitry, including control circuits, formed in a peripheral circuit or control die 311 coupled to memory structure 302 formed in memory structure die 301. Common components are labelled similarly to FIG. 3A. It can be seen that system control logic 360, row control circuitry 320, and column control circuitry 310 are located in control die 311. In some embodiments, all or a portion of the column control circuitry 310 and all or a portion of the row control circuitry 320 are located on the memory structure die 301. In some embodiments, some of the circuitry in the system control logic 360 is located on the on the memory structure die 301.

System control logic 360, row control circuitry 320, and column control circuitry 310 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 310). Thus, while moving such circuits from a die such as memory structure die 301 may reduce the number of steps needed to fabricate such a die, adding such circuits to a die such as control die 311 may not require any additional process steps. The control die 311 could also be referred to as a CMOS die, due to the use of CMOS technology to implement some or all of control circuitry 360, 310, 320.

FIG. 3B shows column control circuitry 310 including sense amplifier(s) 350 on the control die 311 coupled to memory structure 302 on the memory structure die 301 through electrical paths 306. For example, electrical paths 306 may provide electrical connection between column decoder 312, driver circuitry 314, and block select 316 and bit lines of memory structure 302. Electrical paths may extend from column control circuitry 310 in control die 311 through pads on control die 311 that are bonded to corresponding pads of the memory structure die 301, which are connected to bit lines of memory structure 302. Each bit line of memory structure 302 may have a corresponding electrical path in electrical paths 306, including a pair of bond pads, which connects to column control circuitry 310. Similarly, row control circuitry 320, including row decoder 322, array drivers 324, and block select 326 are coupled to memory structure 302 through electrical paths 308. Each electrical path 308 may correspond to a word line, dummy word line, or select gate line. Additional electrical paths may also be provided between control die 311 and memory structure die 301.

For purposes of this document, the phrase "one or more control circuits" can include one or more of controller 102, system control logic 360, column control circuitry 310, row control circuitry 320, a micro-controller, a state machine, and/or other control circuitry, or other analogous circuits that are used to control non-volatile memory. The one or more control circuits can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Figure 4:
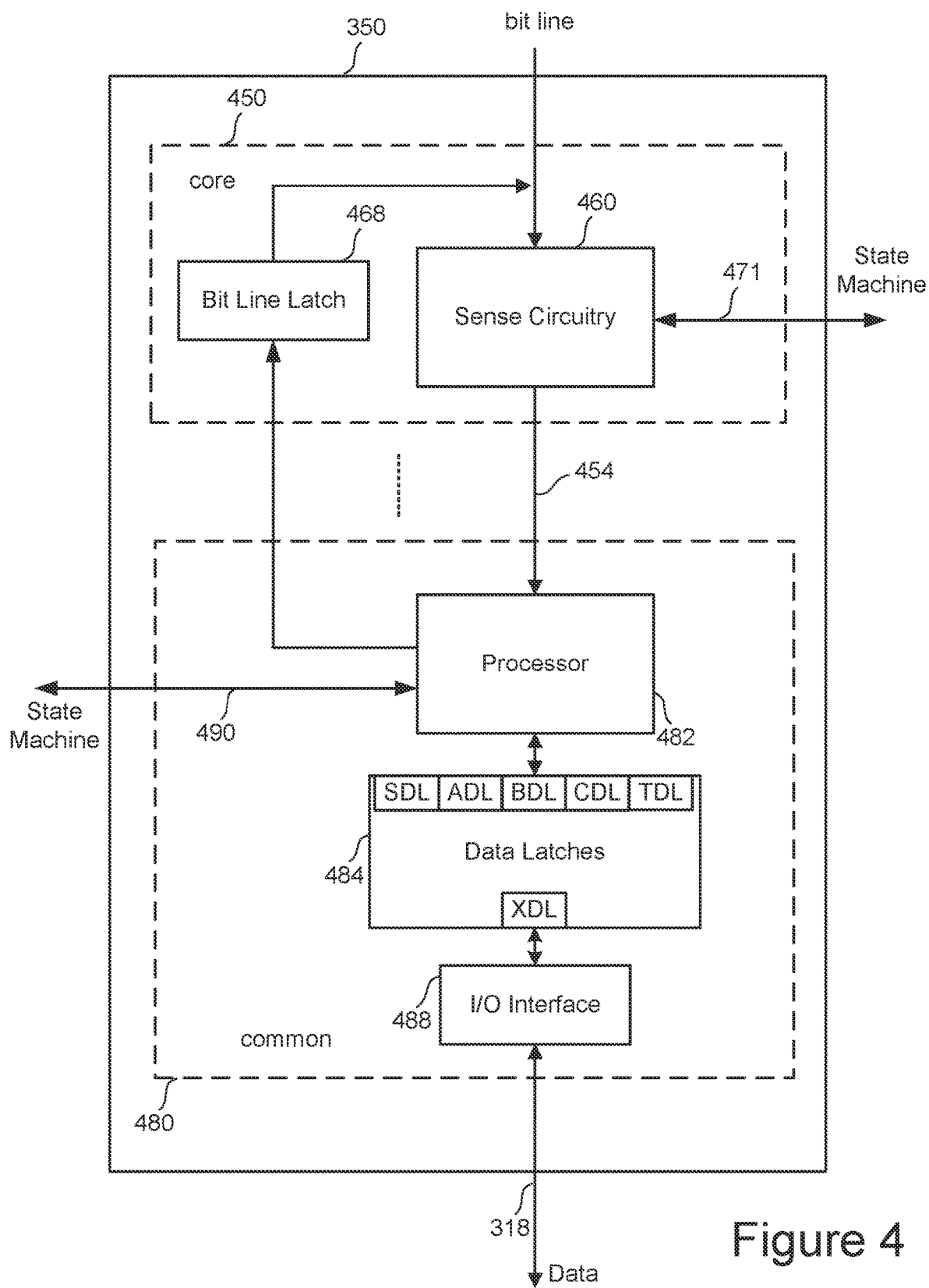
FIG. 4 is a block diagram of an individual sense block partitioned into a core portion and a common portion.

FIG. 4 is a block diagram of an individual sense block of sense amplifiers 350 partitioned into a core portion, referred to as a sense module 480, and a common portion 480. In one embodiment, there will be a separate sense module 450 for each bit line and one common portion 480 for a set of multiple sense modules 450. In one example, a sense block will include one common portion 480 and eight sense, twelve, or sixteen modules 450. Each of the sense modules in a group will communicate with the associated common portion via a data bus 454.

Sense module 450 comprises sense circuitry 460 that determines whether a conduction current in a connected bit line is above or below a predetermined level or, in voltage based sensing, whether a voltage level in a connected bit line is above or below a predetermined level. The sense circuitry 460 is to receive control signals from the state machine via input lines 471. In some embodiments, sense module 450 includes a circuit commonly referred to as a sense amplifier. Sense module 450 also includes a bit line latch 468 that is used to set a voltage condition on the connected bit line. For example, a predetermined state latched in bit line latch 468 will result in the connected bit line being pulled to a state designating program inhibit (e.g., VDD).

Common portion 480 comprises a processor 468, a set of data latches 484 and an I/O Interface 488 coupled between the set of data latches 484 and data bus 318. Processor 482 performs computations. For example, one of its functions is to determine the data stored in the sensed memory cell and store the determined data in the set of data latches. The set of data latches 484 is used to store data bits determined by processor 468 during a read operation. It is also used to store data bits imported from the data bus 318 during a program operation. The imported data bits represent write data meant to be programmed into the memory. I/O interface 488 provides an interface between data latches 484 and the data bus 318.

During read or sensing, the operation of the system is under the control of state machine 362 that controls (using power control 364) the supply of different control gate or other bias voltages to the addressed memory cell(s). As it steps through the various predefined control gate voltages corresponding to the various memory states supported by the memory, the sense module 450 may trip at one of these voltages and an output will be provided from sense module 450 to processor 468 via bus 454. At that point, processor 468 determines the resultant memory state by consideration of the tripping event(s) of the sense module and the information about the applied control gate voltage from the state machine via input lines 490. It then computes a binary encoding for the memory state and stores the resultant data bits into data latches 484. In another embodiment of the core portion, bit line latch 468 serves double duty, both as a latch for latching the output of the sense module 450 and also as a bit line latch as described above.

Data latch stack 484 contains a stack of data latches corresponding to the sense module. In one embodiment, there are three, four or another number of data latches per sense module 450. In one embodiment, the latches are each one bit. In this document, the latches in one embodiment of data latch stack 484 will be referred to as SDL, XDL, ADL, BDL, and CDL. In the embodiments discussed here, the latch XDL is a transfer latch used to exchange data with the I/O interface 488. In addition to a first sense amp data latch SDL, the additional latches ADL, BDL and CDL can be used to hold multi-state data, where the number of such latches typically reflects the number of bits stored in a memory cell. For example, in 3-bit per cell multi-level cell (MLC) memory format, the three sets of latches ADL, BDL, CDL can be used for upper, middle, lower page data. In a 2-bit per cell embodiment, only ADL and BDL might be used, while a 4-bit per cell MLC embodiment might include a further set of DDL latches. In other embodiments, the XDL latches can be used to hold additional pages of data, such as a 4-bit per cell MLC embodiment the uses the XDL latches in addition to the three sets of latches ADL, BDL, CDL for four pages of data. The following discussion will mainly focus on a 3-bit per cell embodiment, as this can illustrate the main features but not get overly complicated, but the discussion can also be applied to embodiments with more or fewer bit per cell formats. Some embodiments many also include additional latches for particular functions, such as represented by the TDL latch where, for example, this could be used in "quick pass write" operations where it is used in program operations for when a memory cell is approaching its target state and is partially inhibited to slow its programming rate. In embodiments discussed below, the latches ADL, BDL, . . . can transfer data between themselves and the bit line latch 468 and with the transfer latch XDL, but not directly with the I/O interface 488, so that a transfer from these latches to the I/O interface is transferred by way of the XDL latches.

For example, in some embodiments data read from a memory cell or data to be programmed into a memory cell will first be stored in XDL. In case the data is to be programmed into a memory cell, the system can program the data into the memory cell from XDL. In one embodiment, the data is programmed into the memory cell entirely from XDL before the next operation proceeds. In other embodiments, as the system begins to program a memory cell through XDL, the system also transfers the data stored in XDL into ADL in order to reset XDL. Before data is transferred from XDL into ADL, the data kept in ADL is transferred to BDL, flushing out whatever data (if any) is being kept in BDL, and similarly for BDL and CDL. Once data has been transferred from XDL into ADL, the system continues (if necessary) to program the memory cell through ADL, while simultaneously loading the data to be programmed into a memory cell on the next word line into XDL, which has been reset. By performing the data load and programming operations simultaneously, the system can save time and thus perform a sequence of such operations faster.

During program or verify, the data to be programmed is stored in the set of data latches 484 from the data bus 318. During the verify process, Processor 468 monitors the verified memory state relative to the desired memory state. When the two are in agreement, processor 468 sets the bit line latch 468 so as to cause the bit line to be pulled to a state designating program inhibit. This inhibits the memory cell coupled to the bit line from further programming even if it is subjected to programming pulses on its control gate. In other embodiments the processor initially loads the bit line latch 468 and the sense circuitry sets it to an inhibit value during the verify process.

In some implementations (but not required), the data latches are implemented as a shift register so that the parallel data stored therein is converted to serial data for data bus 318, and vice versa. In one preferred embodiment, all the data latches corresponding to the read/write block of m memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Figure 5:
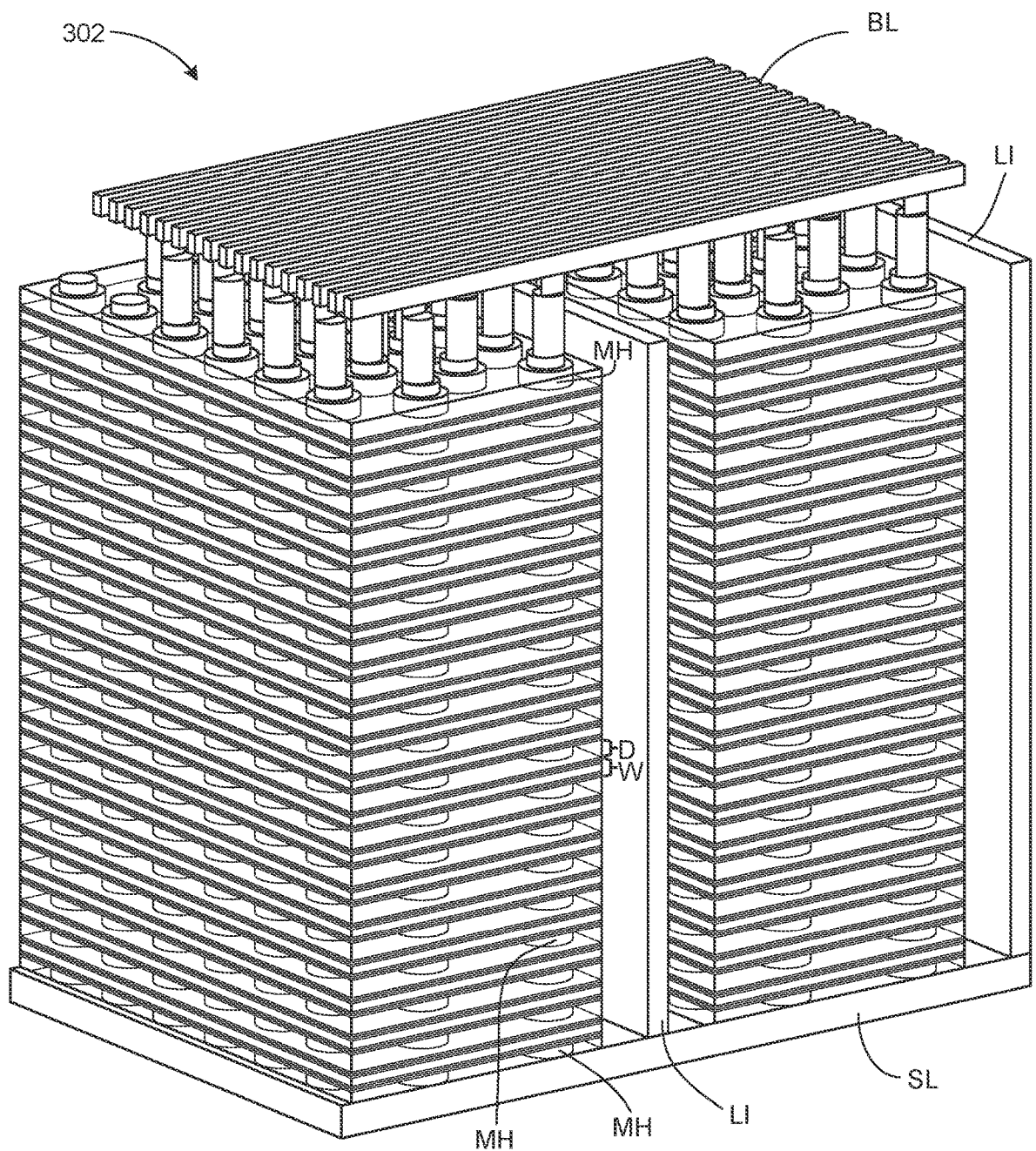
FIG. 5 is a perspective view of a portion of one example embodiment of a monolithic three dimensional memory array that can comprise memory structure.

FIG. 5 is a perspective view of a portion of one example embodiment of a monolithic three dimensional memory array that can comprise memory structure 302, which includes a plurality non-volatile memory cells. For example, FIG. 5 shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The word line layers contain one or more word lines that are connected to memory cells. For example, a word line may be connected to a control gate of a memory cell. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into multiple "fingers" or sub-blocks by local interconnects LI, in an embodiment. FIG. 5 shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/memory holes is marked as MH. Note that in FIG. 5, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data.

Figure 6A:
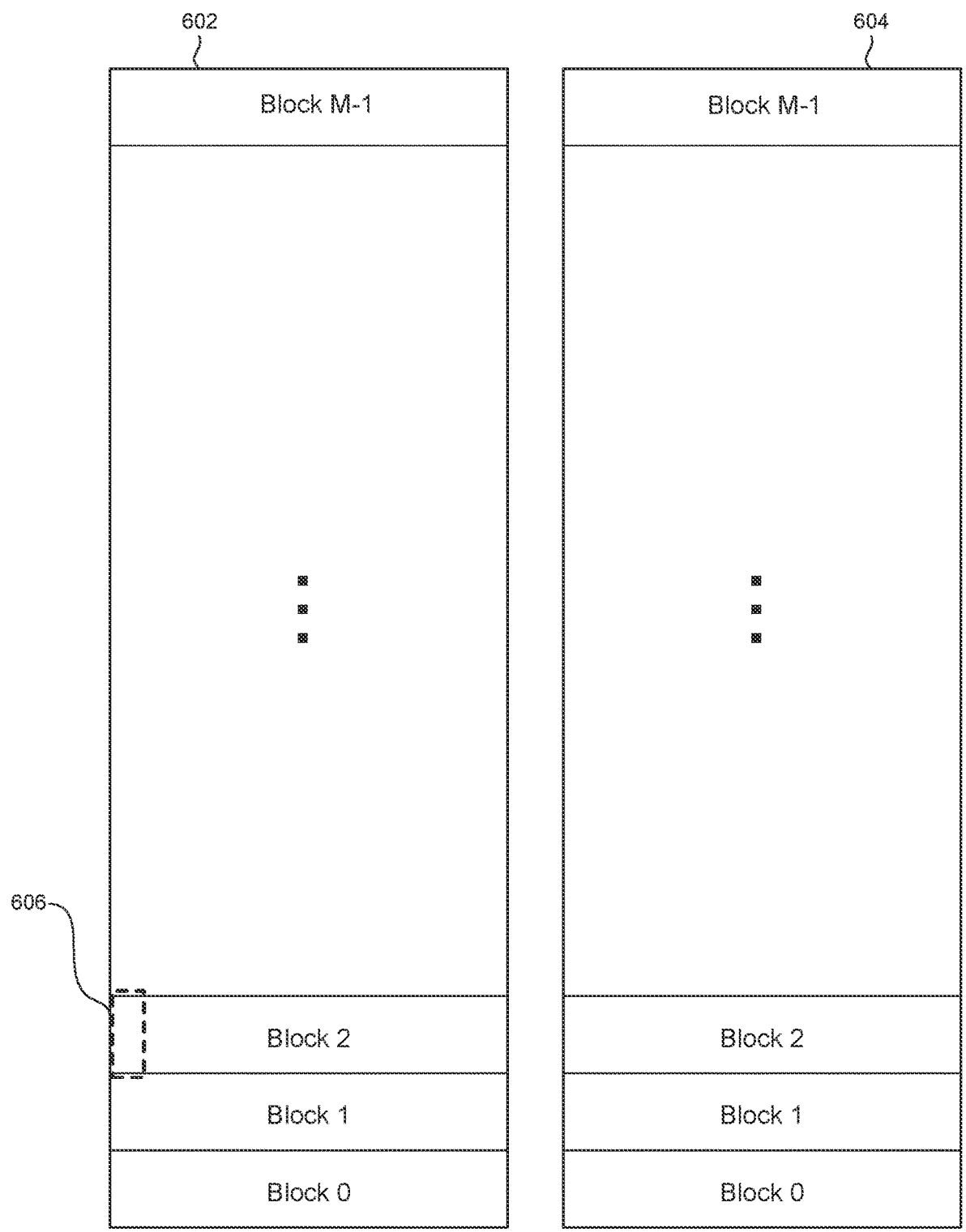
FIG. 6A is a block diagram explaining one example organization of memory structure.

FIG. 6A is a block diagram explaining one example organization of memory structure 302, which is divided into two planes 602 and 604. Each plane is then divided into M blocks. In one example, each plane has about 2000 blocks. However, different numbers of blocks and planes can also be used. In one embodiment, for two plane memory, the block IDs are usually such that even blocks belong to one plane and odd blocks belong to another plane; therefore, plane 602 includes block 0, 2, 4, 6, . . . and plane 604 includes blocks 1, 3, 5, 7, . . . . In on embodiment, a block of memory cells is a unit of erase. That is, all memory cells of a block are erased together. In other embodiments, memory cells can be grouped into blocks for other reasons, such as to organize the memory structure 302 to enable the signaling and selection circuits.

Figure 6B:
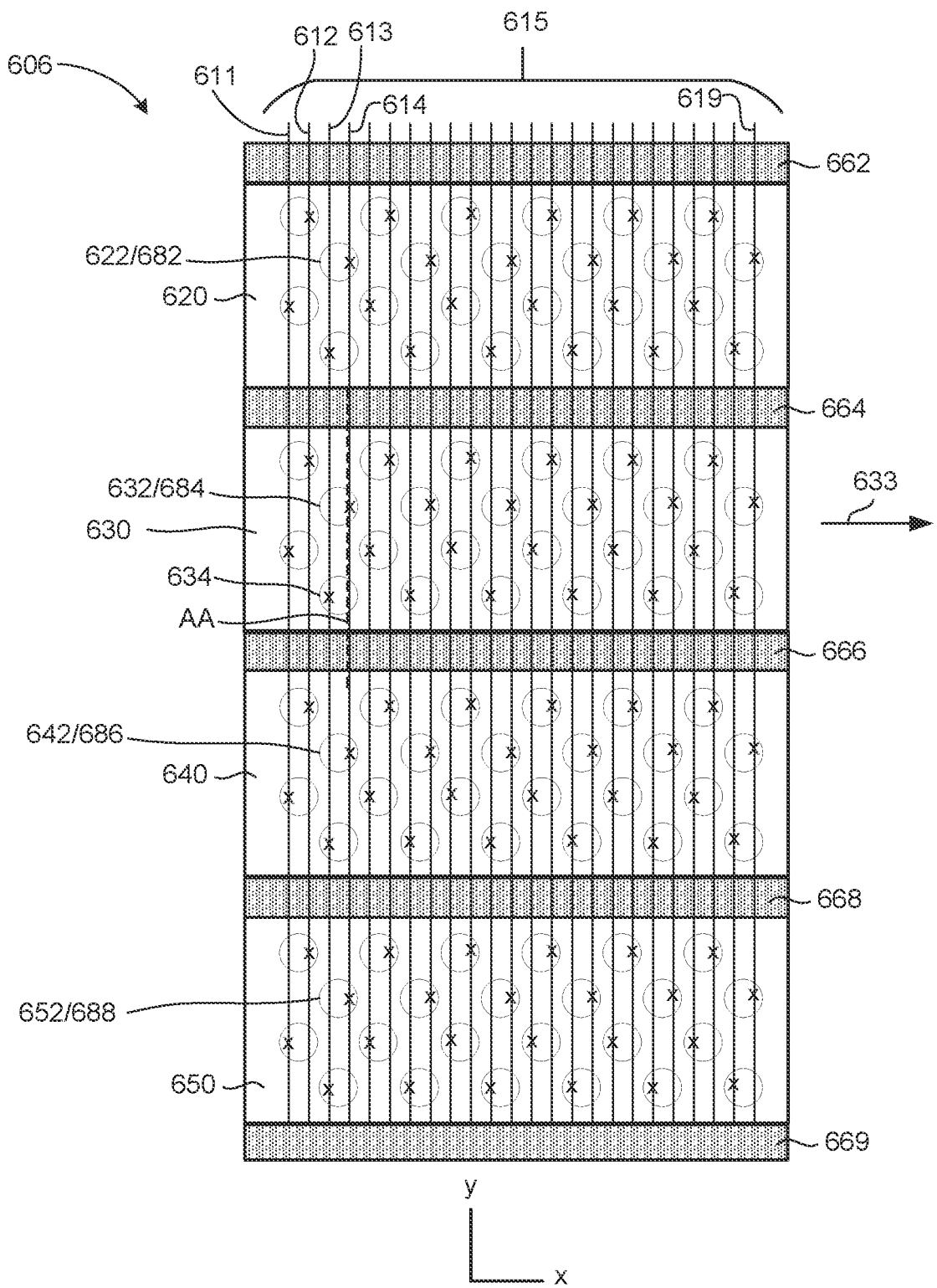
FIG. 6B is a block diagram depicting a top view of a portion of one block from the memory structure.
Figure 6C:
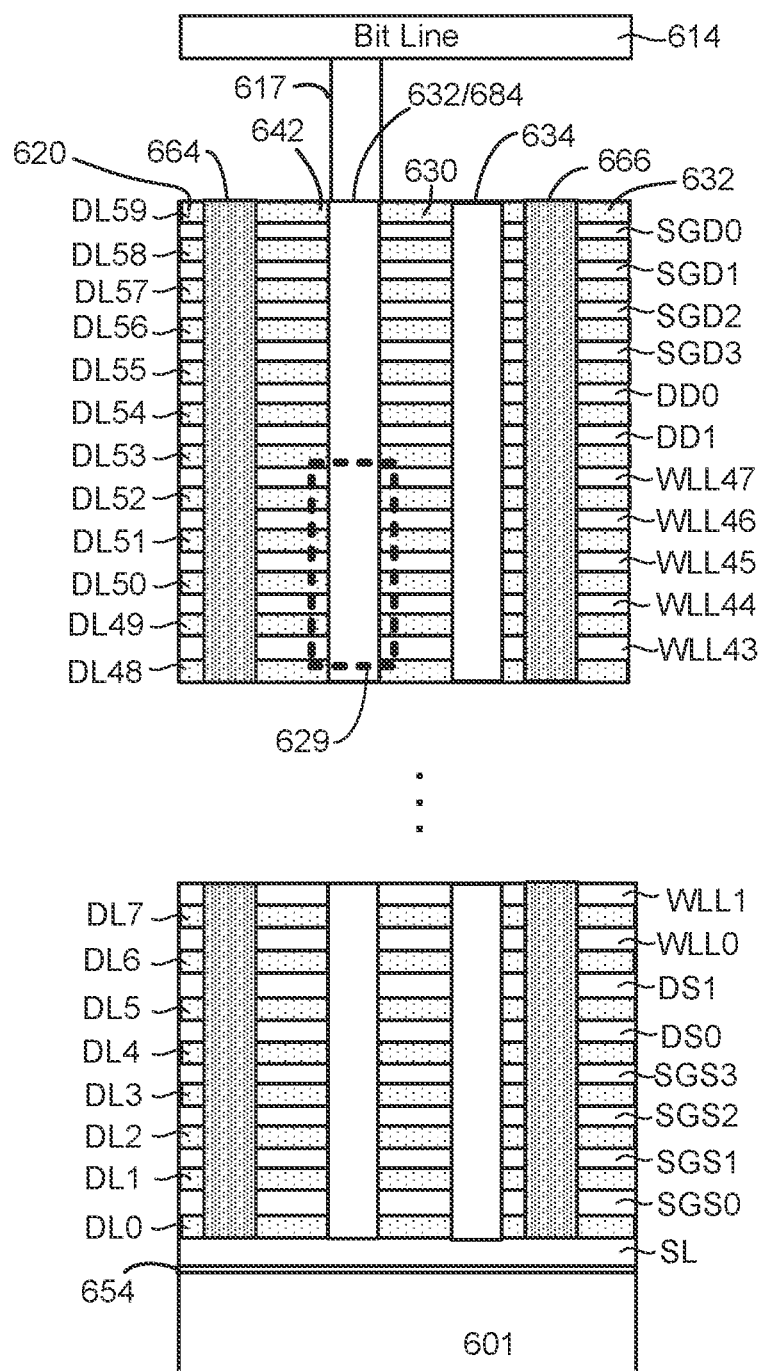
FIG. 6C depicts a portion of an embodiment of three dimensional memory structure showing a cross-sectional view along line AA of FIG. 6B.
Figure 6D:
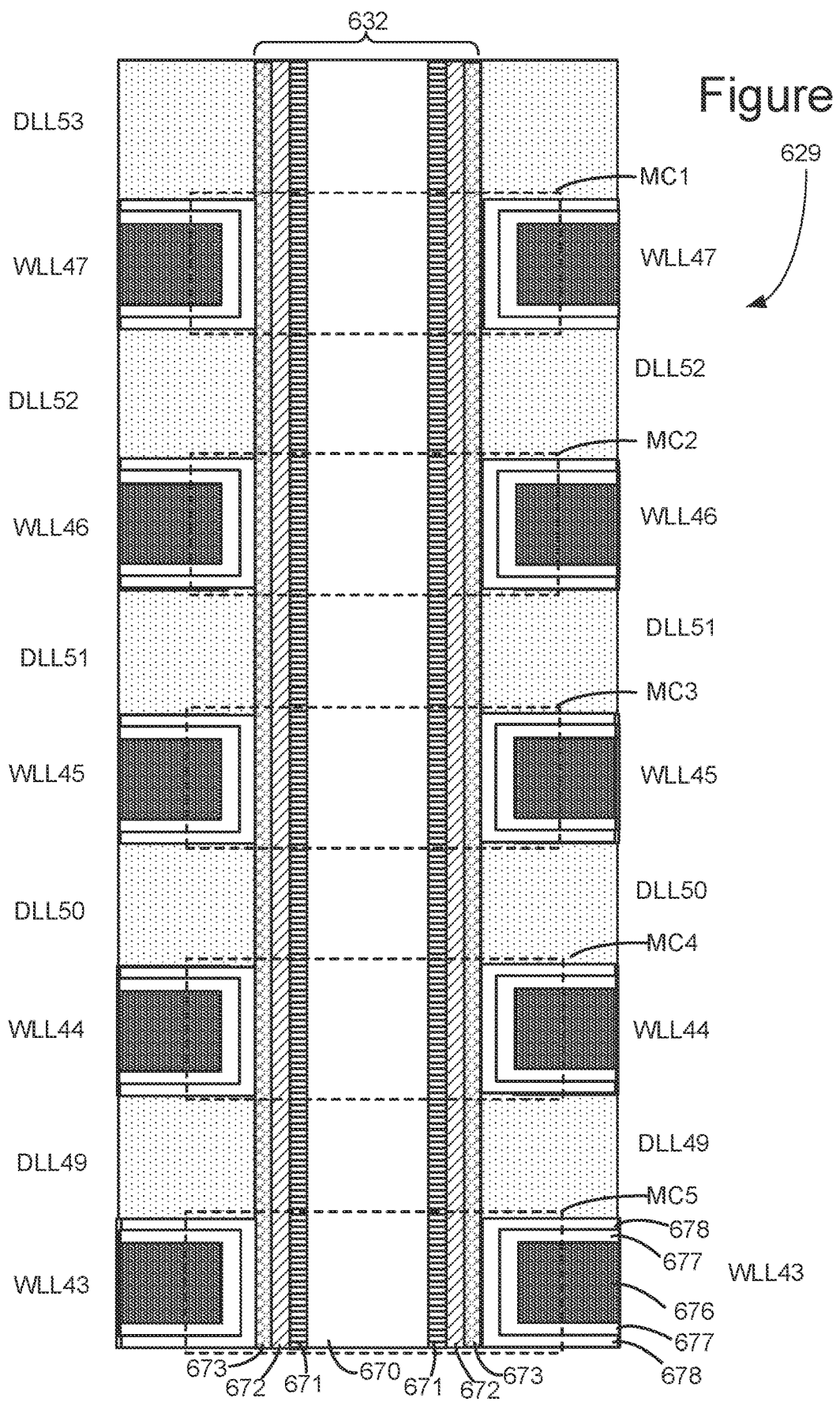
FIG. 6D depicts a cross sectional view of region of FIG. 6C that includes a portion of a vertical column.

FIGS. 6B-6D depict an example 3D NAND structure. FIG. 6B is a block diagram depicting a top view of a portion of one block from memory structure 302. The portion of the block depicted in FIG. 6B corresponds to portion 606 in block 2 of FIG. 6A. As can be seen from FIG. 6B, the block depicted in FIG. 6B extends in the direction of 633. In one embodiment, the memory array will have 60 layers. Other embodiments have less than or more than 60 layers. However, FIG. 6B only shows the top layer.

FIG. 6B depicts a plurality of circles that represent the vertical columns. Each of the vertical columns includes multiple select transistors and multiple memory cells. In one embodiment, each vertical column implements a NAND string. For example, FIG. 6B depicts vertical columns 622, 632, 642 and 652. Vertical column 622 implements NAND string 682. Vertical column 632 implements NAND string 684. Vertical column 642 implements NAND string 686. Vertical column 652 implements NAND string 688. More details of the vertical columns are provided below. Since the block depicted in FIG. 6B extends in the direction of arrow 633 and in the direction of arrow 633, the block includes more vertical columns than depicted in FIG. 6B.

FIG. 6B also depicts a set of bit lines 615, including bit lines 611, 612, 613, 614, . . . , 619. FIG. 6B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 614 is connected to vertical columns 622, 632, 642 and 652.

The block depicted in FIG. 6B includes a set of local interconnects 662, 664, 666, 668 and 669 that connect the various layers to a source line below the vertical columns. Local interconnects 662, 664, 666, 668 and 669 also serve to divide each layer of the block into four regions; for example, the top layer depicted in FIG. 6B is divided into regions 620, 630, 640 and 650, which are referred to as fingers or sub-blocks. In the layers of the block that implement memory cells, the four regions are referred to as word line sub-blocks that are separated by the local interconnects. In one embodiment, the word line sub-blocks on a common level of a block connect together at the end of the block to form a single word line. In another embodiment, the word line sub-blocks on the same level are not connected together. In one example implementation, a bit line only connects to one vertical column in each of regions 620, 630, 640 and 650. In that implementation, each block has sixteen rows of active columns and each bit line connects to four rows in each block. In one embodiment, all of four rows connected to a common bit line are connected to the same word line (via different word line sub-blocks on the same level that are connected together); therefore, the system uses the source side select lines and the drain side select lines to choose one (or another subset) of the four to be subjected to a memory operation (program, verify, read, and/or erase).

Although FIG. 6B shows each region having four rows of vertical columns, four regions and sixteen rows of vertical columns in a block, those exact numbers are an example implementation. Other embodiments may include more or fewer regions per block, more or fewer rows of vertical columns per region and more or fewer rows of vertical columns per block.

FIG. 6B also shows the vertical columns being staggered. In other embodiments, different patterns of staggering can be used. In some embodiments, the vertical columns are not staggered.

FIG. 6C depicts a portion of an embodiment of three dimensional memory structure 302 showing a cross-sectional view along line AA of FIG. 6B. This cross sectional view cuts through vertical columns 632 and 634 and region 630 (see FIG. 6B). The structure of FIG. 6C includes four drain side select layers SGD0, SGD1, SGD2 and SGD3; four source side select layers SGS0, SGS1, SGS2 and SGS3; four dummy word line layers DD0, DD1, DS0 and DS1; and forty-eight data word line layers WLL0-WLL47 for connecting to data memory cells. Other embodiments can implement more or less than four drain side select layers, more or less than four source side select layers, more or fewer than four dummy word line layers, and more or fewer than forty eight word line layers (e.g., 96 word line layers). Vertical columns 632 and 634 are depicted protruding through the drain side select layers, source side select layers, dummy word line layers and word line layers. In one embodiment, each vertical column comprises a NAND string. For example, vertical column 632 comprises NAND string 684. Below the vertical columns and the layers listed below is substrate 601, an insulating film 654 on the substrate, and source line SL. The NAND string of vertical column 632 has a source end at a bottom of the stack and a drain end at a top of the stack. As in agreement with FIG. 6B, FIG. 6C show vertical column 632 connected to Bit Line 614 via connector 617. Local interconnects 664 and 666 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL47 collectively are referred to as the conductive layers. In one embodiment, the conductive layers are made from a combination of TiN and tungsten. In other embodiments, other materials can be used to form the conductive layers, such as doped polysilicon, metal such as tungsten or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from SiO$_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WLL0-WLL47 connect to memory cells (also called data memory cells). Dummy word line layers DD0, DD1, DS0 and DS1 connect to dummy memory cells. A dummy memory cell does not store user data, while a data memory cell is eligible to store user data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

In some embodiments, the word lines are read sequentially, which means that the word lines are read either from low to high (e.g., WLL0 to WLL47) or from high to low (e.g., WLL47 to WLL0). It is not required to read the entire set of word lines when reading sequentially. Techniques are disclosed herein for providing compensation for interference caused by adjacent memory cells on target memory cells during a sequential read.

In some embodiments, the read of an individual word line is broken down into separate reads of sub-blocks. Referring again to FIG. 6B, the block is divided into four sub-blocks 620, 630, 640, 650. Thus, the four sub-blocks on one word line layer may be read, prior to reading the four sub-blocks on an adjacent word line layer. In some embodiments, data state information is used to provide compensation on a sub-block basis. For example, data state information for memory cells at WLL35 is kept for each of the four sub-blocks 620-650. Then, when reading sub-block 620 at WLL36 the data state information for sub-block 620 at WLL35 is used to compensate for interference from adjacent memory cells in sub-block 620 at WLL35, when reading sub-block 630 at WLL36 the data state information for sub-block 630 at WLL35 is used to compensate for interference from adjacent memory cells in sub-block 620 at WLL35, etc.

FIG. 6D depicts a cross sectional view of region 629 of FIG. 6C that includes a portion of vertical column 632. In one embodiment, the vertical columns are round and include four layers; however, in other embodiments more or less than four layers can be included and other shapes can be used. In one embodiment, vertical column 632 includes an inner core layer 670 that is made of a dielectric, such as SiO$_2$. Other materials can also be used. Surrounding inner core 670 is polysilicon channel 671. Materials other than polysilicon can also be used. Note that it is the channel 671 that connects to the bit line. Surrounding channel 671 is a tunneling dielectric 672. In one embodiment, tunneling dielectric 672 has an ONO structure. Surrounding tunneling dielectric 672 is charge trapping layer 673, such as (for example) Silicon Nitride. Other memory materials and structures can also be used. The technology described herein is not limited to any particular material or structure.

FIG. 6D depicts dielectric layers DLL49, DLL50, DLL51, DLL52 and DLL53, as well as word line layers WLL43, WLL44, WLL45, WLL46, and WLL47. Each of the word line layers includes a word line region 676 surrounded by an aluminum oxide layer 677, which is surrounded by a blocking oxide (SiO$_2$) layer 678. The physical interaction of the word line layers with the vertical column forms the memory cells. Thus, a memory cell, in one embodiment, comprises channel 671, tunneling dielectric 672, charge trapping layer 673, blocking oxide layer 678, aluminum oxide layer 677 and word line region 676. For example, word line layer WLL47 and a portion of vertical column 632 comprise a memory cell MC1. Word line layer WLL46 and a portion of vertical column 632 comprise a memory cell MC2. Word line layer WLL45 and a portion of vertical column 632 comprise a memory cell MC3. Word line layer WLL44 and a portion of vertical column 632 comprise a memory cell MC4. Word line layer WLL43 and a portion of vertical column 632 comprise a memory cell MC5. In other architectures, a memory cell may have a different structure; however, the memory cell would still be the storage unit.

Note that the charge trapping layer 673 may extend from one end of the NAND string to the other, and hence may be referred to herein as a continuous charge trapping layer. When a memory cell is programmed, electrons are stored in a portion of the charge trapping layer 673 which is associated with the memory cell. These electrons are drawn into the charge trapping layer 673 from the channel 671, through the tunneling dielectric 672, in response to an appropriate voltage on word line region 676. The Vt of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Figure 6E:
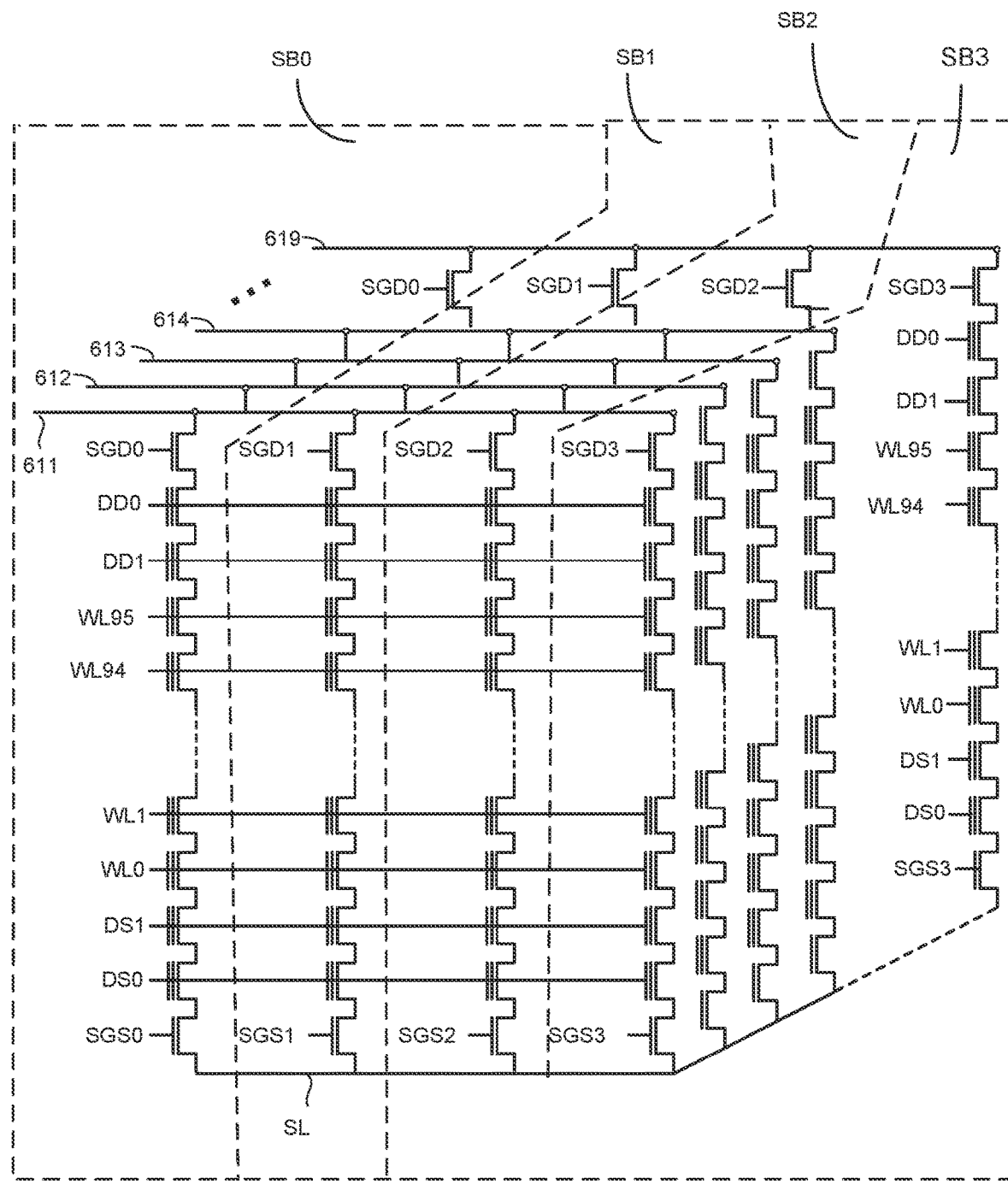
FIG. 6E is a schematic of a plurality of NAND strings showing multiple sub-blocks.

FIG. 6E is a schematic diagram of a portion of the memory depicted in FIGS. 5-6D. FIG. 6E shows physical word lines WLL0-WLL95 running across the entire block. The structure of FIG. 6E corresponds to portion 606 in Block 2 of FIGS. 5-6D, including bit lines 611, 612, 613, 614, . . . , 619. Within the block, each bit line is connected to four NAND strings. Drain side selection lines SGD0, SGD1, SGD2 and SGD3 are used to determine which of the four NAND strings connect to the associated bit line(s). Source side selection lines SGS0, SGS1, SGS2 and SGS3 are used to determine which of the four NAND strings connect to the common source line. The block can also be thought of as divided into four sub-blocks SB0, SB1, SB2 and SB3. Sub-block SB0 corresponds to those vertical NAND strings controlled by SGD0 and SGS0, sub-block SB1 corresponds to those vertical NAND strings controlled by SGD1 and SGS1, sub-block SB2 corresponds to those vertical NAND strings controlled by SGD2 and SGS2, and sub-block SB3 corresponds to those vertical NAND strings controlled by SGD3 and SGS3.

Although the example memory system of FIGS. 5-6E is a three dimensional memory structure that includes vertical NAND strings with charge-trapping material, other (2D and 3D) memory structures (e.g., MRAM, ReRAM, PCM) can also be used with the technology described herein.

The memory systems discussed above can be erased, programmed and read. At the end of a successful programming process (with verification), the threshold voltages of the memory cells should be within one or more distributions of threshold voltages for programmed memory cells or within a distribution of threshold voltages for erased memory cells, as appropriate.

FIG. 7A is a graph of threshold voltage versus number of memory cells, and illustrates example threshold voltage distributions for the memory array when each memory cell stores one bit of data. FIG. 7A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." Memory cells that store one bit of data are referred to as single level cells ("SLC").

FIG. 7B is a graph of threshold voltage versus number of memory cells, and illustrates example threshold voltage distributions for the memory array when each memory cell stores three bits of data. Other embodiments, however, may use other data capacities per memory cell (e.g., such as one, two, four, or five bits of data per memory cell). Memory cells that store more than one bit of data are referred to as multi-level cells ("MLC"). FIG. 7B shows eight threshold voltage distributions, corresponding to eight data states. For a data state N, that data state N has higher threshold voltages than data state N−1 and lower threshold voltages than data state N+1. The first threshold voltage distribution (data state) S0 represents memory cells that are erased. The other seven threshold voltage distributions (data states) S1-S7 represent memory cells that are programmed and, therefore, are also called programmed data states. In some embodiments, data states S1-S7 can overlap, with controller 122 relying on error correction to identify the correct data being stored.

FIG. 7B shows seven read reference voltages, Vr1, Vr2, Vr3, Vr4, Vr5, Vr6, and Vr7 for reading data from memory cells. By testing (e.g., performing sense operations) whether the threshold voltage of a given memory cell is above or below the seven read reference voltages, the system can determine what data state (i.e., S0, S1, S2, S3, . . . ) a memory cell is in. In FIG. 7A, read reference voltage Vr is used to test whether memory cells are erased or programmed.

FIG. 7B also shows seven verify reference voltages, Vv1, Vv2, Vv3, Vv4, Vv5, Vv6, and Vv7 (also referred to as verify target voltages). When programming memory cells to data state S1, the system will test whether those memory cells have a threshold voltage greater than or equal to Vv1. When programming memory cells to data state S2, the system will test whether the memory cells have threshold voltages greater than or equal to Vv2. When programming memory cells to data state S3, the system will determine whether memory cells have their threshold voltage greater than or equal to Vv3. When programming memory cells to data state S4, the system will test whether those memory cells have a threshold voltage greater than or equal to Vv4. When programming memory cells to data state S5, the system will test whether those memory cells have a threshold voltage greater than or equal to Vv5. When programming memory cells to data state S6, the system will test whether those memory cells have a threshold voltage greater than or equal to Vv6. When programming memory cells to data state S7, the system will test whether those memory cells have a threshold voltage greater than or equal to Vv7.

In one embodiment, known as full sequence programming, memory cells can be programmed from the erased data state S0 directly to any of the programmed data states S1-S7. For example, a population of memory cells to be programmed may first be erased so that all memory cells in the population are in erased data state S0. Then, a programming process is used to program memory cells directly into data states S1, S2, S3, S4, S5, S6, and/or S7. For example, while some memory cells are being programmed from data state S0 to data state S1, other memory cells are being programmed from data state S0 to data state S2 and/or from data state S0 to data state S3, and so on. The arrows of FIG. 7B represent the full sequence programming. The technology described herein can also be used with other types of programming in addition to full sequence programming including (but not limited to) multiple stage/phase programming.

Each threshold voltage distribution (data state) of FIG. 7B corresponds to predetermined values for the set of data bits stored in the memory cells. The specific relationship between the data programmed into the memory cell and the threshold voltage levels of the memory cell depends upon the data encoding scheme adopted for the memory cells. In one embodiment, data values are assigned to the threshold voltage ranges using a Gray code assignment so that if the threshold voltage of a memory erroneously shifts to its neighboring physical state, only one bit will be affected.

FIG. 7C is a table describing one example of an assignment of data values to data states. In the table of FIG. 7B, S0=111 (erased state), S1=110, S2=100, S3=000, S4=010, S5=011, S6=001 and S7=101. Other encodings of data can also be used. No particular data encoding is required by the technology disclosed herein. In one embodiment, when a block is subjected to an erase operation, all memory cells are moved to data state S0, the erased state. Referring back to FIG. 4, in one embodiment the ADL, BDL, and CDL data latches can respectively be used for the lower, middle, and upper page data values of a memory cell during a program operation.

In general, during verify operations and read operations, the selected word line is connected to a voltage (one example of a reference signal), a level of which is specified for each read operation (e.g., see read reference voltages Vr1, Vr2, Vr3, Vr4, Vr5, Vr6, and Vr7, of FIG. 6) or verify operation (e.g. see verify reference voltages Vv1, Vv2, Vv3, Vv4, Vv5, Vv6, and Vv7 of FIG. 6) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

Figure 8:
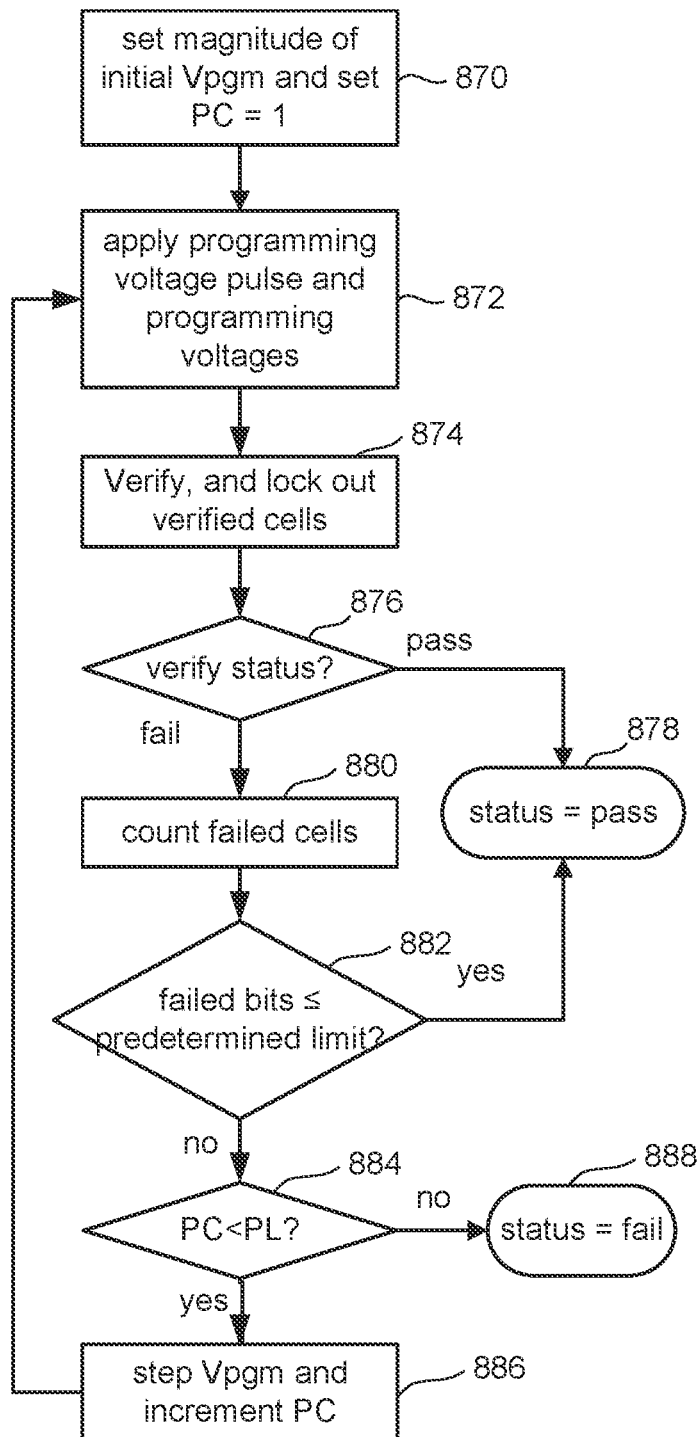
FIG. 8 is a flow chart describing one embodiment of a process for programming non-volatile memory.

FIG. 8 is a flowchart describing one embodiment of a process for programming that is performed by memory die 300/307. In one example embodiment, the process of FIG. 8 is performed on memory die 300/307 using the control circuit discussed above, at the direction of state machine 362. The process of FIG. 8 is performed to implement the programming of FIG. 7A, the full sequence programming of FIG. 7B, or other programming schemes including multi-stage programming. When implementing multi-stage programming, the process of FIG. 8 is used to implement any/each stage of the multi-stage programming process.

Figure 9:
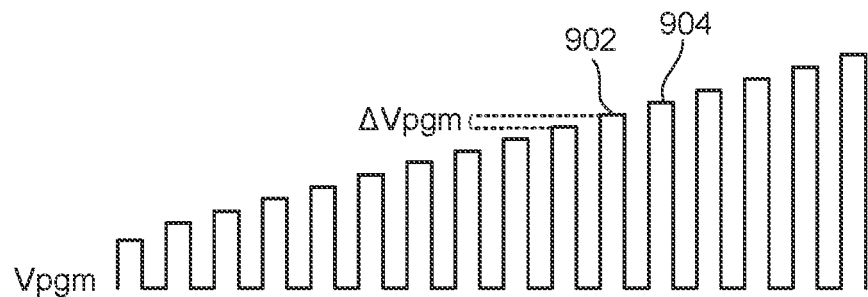
FIG. 9 depicts a series of programming voltage pulses.

Typically, a programming signal Vpgm is applied to the control gates (via a selected word line) during a program operation as a series of programming voltage pulses, as depicted in FIG. 9. Between programming pulses are a set of verify pulses to perform verification. In many implementations, the magnitude of the program pulses is increased with each successive pulse by a predetermined step size ΔVpgm (e.g., 0.2 v-0.5 v). In step 870 of FIG. 8, the programming voltage (Vpgm) is initialized to the starting magnitude (e.g., ~12-16V or another suitable level) and a program counter PC maintained by state machine 362 is initialized at 1. In step 872, a program pulse of the programming signal Vpgm is applied to the selected word line (the word line selected for programming). In one embodiment, the group of memory cells being programmed concurrently are all connected to the same word line (the selected word line). The unselected word lines receive one or more boosting voltages (e.g., ~7-11 volts) to perform boosting schemes known in the art. In one embodiment, if a memory cell should be programmed, then the corresponding bit line is grounded. On the other hand, if the memory cell should remain at its current threshold voltage, then the corresponding bit line is connected to VDD (e.g., 1-3.5 volts) to inhibit programming. In step 872, the programming voltage pulse is concurrently applied to all memory cells connected to the selected word line so that all of the memory cells connected to the selected word line are programmed concurrently. That is, they are programmed at the same time or during overlapping times (both of which are considered concurrent). In this manner all of the memory cells connected to the selected word line will concurrently have their threshold voltage change, unless they have been locked out from programming.

In step 874, the appropriate memory cells are verified using the appropriate set of verify reference voltages to perform one or more verify operations. In one embodiment, the verification process is performed by testing whether the threshold voltages of the memory cells selected for programming have reached the appropriate verify reference voltage.

In step 876, it is determined whether all the memory cells have reached their target threshold voltages (pass). If so, the programming process is complete and successful because all selected memory cells were programmed and verified to their target states. A status of "PASS" (or success) is reported in step 878. If, in 876, it is determined that not all of the memory cells have reached their target threshold voltages (fail), then the programming process continues to step 880.

In step 880, the system counts the number of memory cells that have not yet reached their respective target threshold voltage distribution. That is, the system counts the number of memory cells that have, so far, failed the verify process. This counting can be done by the state machine 362, the controller 102, or other logic. In one implementation, each of the sense blocks will store the status (pass/fail) of their respective memory cells. In one embodiment, there is one total count, which reflects the total number of memory cells currently being programmed that have failed the last verify step. In another embodiment, separate counts are kept for each data state.

In step 882, it is determined whether the count from step 880 is less than or equal to a predetermined limit. In one embodiment, the predetermined limit is a number of bits that can be corrected by error correction codes (ECC) during a read process for the page of memory cells. If the number of failed cells is less than or equal to the predetermined limit, then the programming process can stop and a status of "PASS" is reported in step 878. In this situation, enough memory cells are programmed correctly such that the few remaining memory cells that have not been completely programmed can be corrected using ECC during the read process. In some embodiments, step 880 will count the number of failed cells for each sector, each target data state or other unit, and those counts will individually or collectively be compared to one or more thresholds in step 882.

In one embodiment, the predetermined limit can be less than the total number of bits that can be corrected by ECC during a read process to allow for future errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, then the programming process continues at step 884 and the program counter PC is checked against the program limit value (PL). Examples of program limit values include 6, 20 and 30; however, other values can be used. If the program counter PC is not less than the program limit value PL, then the program process is considered to have failed, and a status of FAIL is reported in step 888. If the program counter PC is less than the program limit value PL, then the process continues at step 886 during which time the Program Counter PC is incremented by 1 and the program voltage Vpgm is stepped up to the next magnitude. For example, the next pulse will have a magnitude greater than the previous pulse by a step size (e.g., a step size of 0.1-0.4 volts). After step 886, the process loops back to step 872 and another program pulse is applied to the selected word line so that another iteration (steps 872-886) of the programming process of FIG. 8 is performed.

Because it is possible that errors can occur when programming or reading, and errors can occur while storing data (e.g., due to electrons drifting, data retention issues or other phenomenon), error correction is used with the programming of data. Memory systems often use Error Correction Codes (ECC) to protect data from corruption. Many ECC coding schemes are well known in the art. These conventional error correction codes are especially useful in large scale memories, including flash (and other non-volatile) memories, because of the substantial impact on manufacturing yield and device reliability that such coding schemes can provide, rendering devices that have a few non-programmable or defective cells as useable. Of course, a tradeoff exists between the yield savings and the cost of providing additional memory cells to store the code bits (i.e., the code "rate"). As such, some ECC codes are better suited for flash memory devices than others. Generally, ECC codes for flash memory devices tend to have higher code rates (i.e., a lower ratio of code bits to data bits) than the codes used in data communications applications (which may have code rates as low as ½). Examples of well-known ECC codes commonly used in connection with flash memory storage include Reed-Solomon codes, other BCH codes, Hamming codes, and the like. Sometimes, the error correction codes used in connection with flash memory storage are "systematic," in that the data portion of the eventual code word is unchanged from the actual data being encoded, with the code or parity bits appended to the data bits to form the complete code word.

The particular parameters for a given error correction code include the type of code, the size of the block of actual data from which the code word is derived, and the overall length of the code word after encoding. For example, a typical BCH code applied to a sector of 512 bytes (4096 bits) of data can correct up to four error bits, if at least 60 ECC or parity bits are used. Reed-Solomon codes are a subset of BCH codes, and are also commonly used for error correction. For example, a typical Reed-Solomon code can correct up to four errors in a 512 byte sector of data, using about 72 ECC bits. In the flash memory context, error correction coding provides substantial improvement in manufacturing yield, as well as in the reliability of the flash memory over time.

In some embodiments, controller 102 receives host data (also referred to as user data or data from an entity external to the memory system), also referred to as information bits, that is to be stored non-volatile memory structure 302. The informational bits are represented by the matrix i=[1 0] (note that two bits are used for example purposes only, and many embodiments have code words longer than two bits). An error correction coding process (such as any of the processes mentioned above or below) is implemented by ECC engine 226/256 of controller 102 in which parity bits are added to the informational bits to provide data represented by the matrix or code word v=[1 0 1 0], indicating that two parity bits have been appended to the data bits. Other techniques can be used that map input data to output data in more complex manners. For example, low density parity check (LDPC) codes, also referred to as Gallager codes, can be used. More details about LDPC codes can be found in R. G. Gallager, "Low-density parity-check codes," IRE Trans. Inform. Theory, vol. IT-8, pp. 21 28, January 1962; and D. MacKay, Information Theory, Inference and Learning Algorithms, Cambridge University Press 2003, chapter 47. In practice, such LDPC codes are typically applied (e.g., by ECC engine 226/256) to multiple pages encoded across a number of storage elements, but they do not need to be applied across multiple pages. The data bits can be mapped to a logical page and stored in memory structure 302 by programming one or more memory cells to one or more programming states, which corresponds to v.

In one embodiment, programming serves to raise the threshold voltage of the memory cells to one of the programmed data states S1-S7. Erasing serves to lower the threshold voltage of the memory cells to the Erase data state S0.

One technique to erase memory cells in some memory devices is to bias a p-well (or other types of) substrate to a high voltage to charge up a NAND channel. An erase enable voltage is applied to control gates of memory cells while the NAND channel is at a high voltage to erase the non-volatile storage elements (memory cells). Another approach to erasing memory cells is to generate gate induced drain leakage (GIDL) current to charge up the NAND string channel. An erase enable voltage is applied to control gates of the memory cells, while maintaining the string channel potential to erase the memory cells.

In one embodiment, the GIDL current is generated by causing a drain-to-gate voltage at a select transistor. A transistor drain-to-gate voltage that generates a GIDL current is referred to herein as a GIDL voltage. The GIDL current may result when the select transistor drain voltage is significantly higher than the select transistor control gate voltage. GIDL current is a result of carrier generation, i.e., electron-hole pair generation due to band-to-band tunneling and/or trap-assisted generation. In one embodiment, GIDL current may result in one type of carriers, e.g., holes, predominantly moving into NAND channel, thereby raising potential of the channel. The other type of carriers, e.g., electrons, are extracted from the channel, in the direction of a bit line or in the direction of a source line, by an electric field. During erase, the holes may tunnel from the channel to a charge storage region of memory cells and recombine with electrons there, to lower the threshold voltage of the memory cells.

The GIDL current may be generated at either end of the NAND string. A first GIDL voltage may be created between two terminals of a select transistor (e.g., drain side select transistor) that is connected to a bit line to generate a first GIDL current. A second GIDL voltage may be created between two terminals of a select transistor (e.g., source side select transistor) that is connected to a source line to generate a second GIDL current. Erasing based on GIDL current at only one end of the NAND string is referred to as a one-sided GIDL erase. Erasing based on GIDL current at both ends of the NAND string is referred to as a two-sided GIDL erase.

Figure 10:
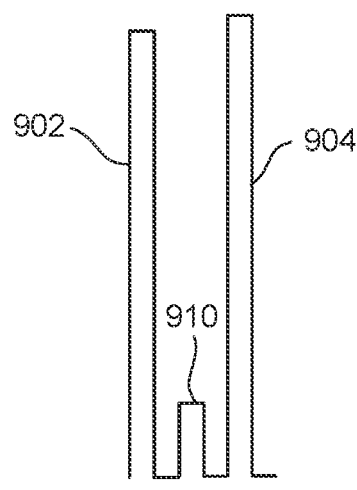
FIG. 10 depicts two programming voltage pulses and a verify voltage pulse.
Figure 11:
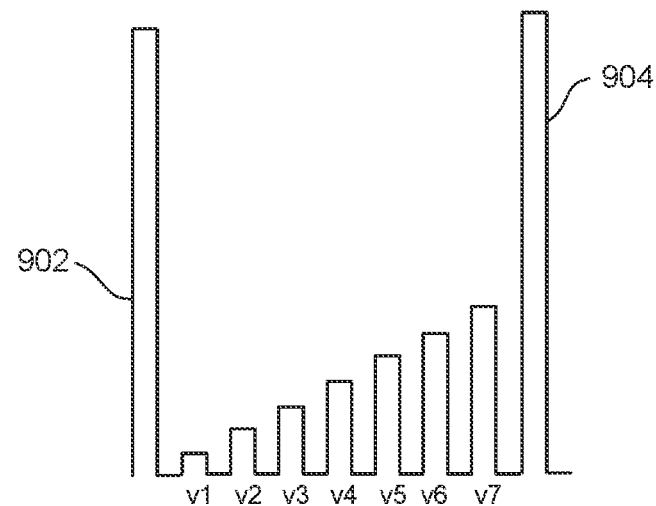
FIG. 11 depicts two programming voltage pulses and a set of verify voltage pulses.

As discussed above, FIG. 9 depicts the programming signal Vpgm as a series of programming voltage pulses. These programming voltage pulses are one example of doses of programming applied to a plurality of non-volatile memory cells being programmed to a data state. As described by FIG. 8, the system performs program verification between the doses of programming, as depicted in FIGS. 10 and 11. FIG. 10, which illustrates an embodiment in which memory cells store one bit of data per memory cell, depicts two of the programming voltage pulses 902 and 904 of FIG. 9. Between programming voltage pulses 902 and 904 is verify voltage pulse 910. In one embodiment, verify voltage pulse 910 has a magnitude of Vv (see FIG. 7A) and represents the system performing program verification (step 874) between the doses of programming (successive iterations of step 872).

FIG. 11, which illustrates an embodiment in which memory cells store three bits of data per memory cell, depicts two of the programming voltage pulses 902 and 904 of FIG. 9. Between programming voltage pulses 902 and 904 are verify voltage pulses v1, v2, v3, v4, v5, v6 and v7. In one embodiment, verify voltage pulse v1 has a magnitude of Vv1 (see FIG. 7B), verify voltage pulse v2 has a magnitude of Vv2, verify voltage pulse v3 has a magnitude of Vv3, verify voltage pulse v4 has a magnitude of Vv4, verify voltage pulse v5 has a magnitude of Vv5, verify voltage pulse v6 has a magnitude of Vv6, and verify voltage pulse v7 has a magnitude of Vv7. Verify voltage pulses v1, v2, v3, v4, v5, v6 and v7 represent the system performing program verification (step 874) between the doses of programming (successive iterations of step 872).

Figure 12:
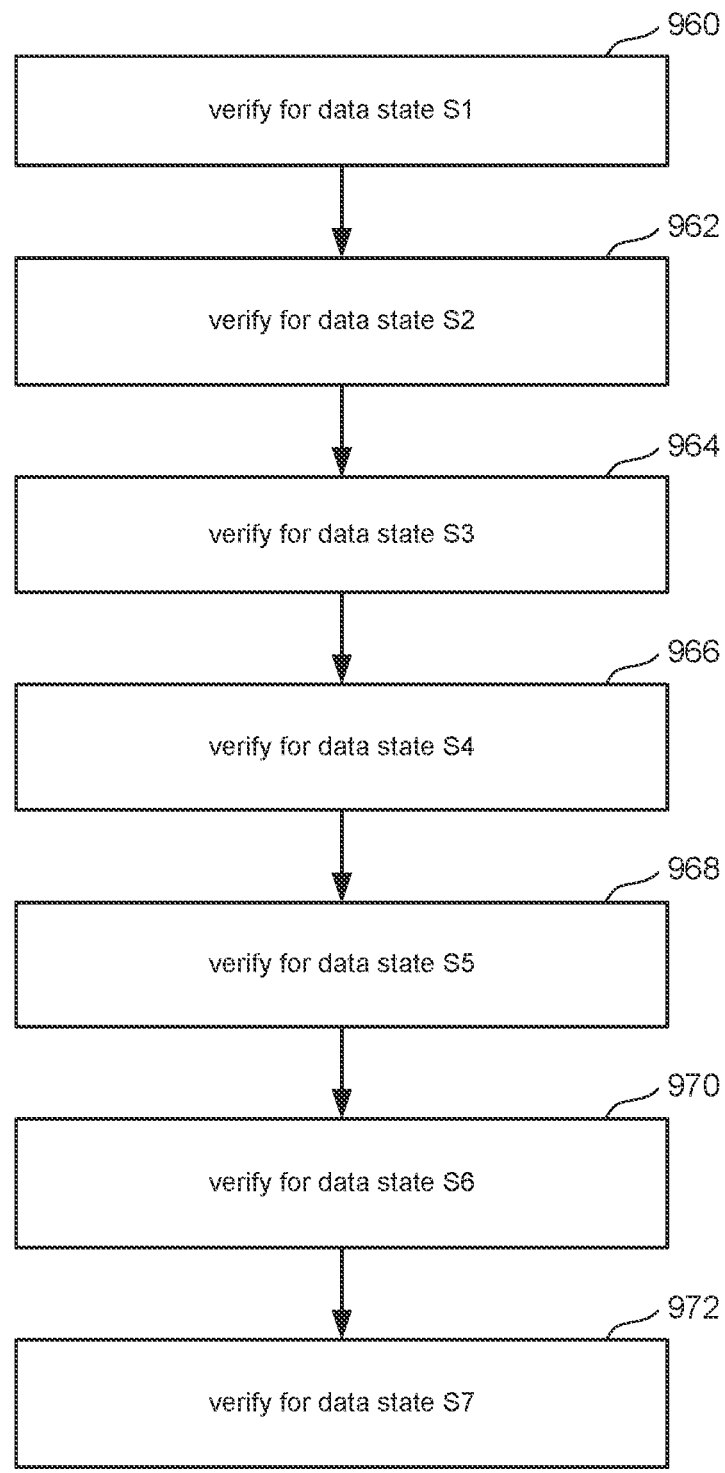
FIG. 12 is a flow chart describing one embodiment of a process for verifying programming of non-volatile memory.

FIG. 12 is a flow chart describing one embodiment of a process for verifying programming of non-volatile memory. That is, the process of FIG. 12 is a process performed during an example implementation of step 874 of FIG. 8 for an embodiment in which memory cells store three bits of data per memory cell. The process of FIG. 12 is performed using the waveforms of FIGS. 9 and 11. In step 960 of FIG. 12, the system performs verification for data state S1. For example, the system tests whether memory cells being programmed to data state S1 have threshold voltages greater than Vv1 (e.g., applying verify voltage pulse v1 of FIG. 11 to the control gates of memory cells being programmed to data state S1).

In step 962, the system performs verification for data state S2. For example, the system tests whether memory cells being programmed to data state S2 have threshold voltages greater than Vv2 (e.g., applying verify voltage pulse v2 of FIG. 11 to the control gates of memory cells being programmed to data state S2).

In step 964, the system performs verification for data state S3. For example, the system tests whether memory cells being programmed to data state S3 have threshold voltages greater than Vv3 (e.g., applying verify voltage pulse v3 of FIG. 11 to the control gates of memory cells being programmed to data state S3).

In step 966, the system performs verification for data state S4. For example, the system tests whether memory cells being programmed to data state S4 have threshold voltages greater than Vv4 (e.g., applying verify voltage pulses v4 of FIG. 11 to the control gates of memory cells being programmed to data state S4).

In step 968, the system performs verification for data state S5. For example, the system tests whether memory cells being programmed to data state S5 have threshold voltages greater than Vv5 (e.g., applying verify voltage pulses v5 of FIG. 11 to the control gates of memory cells being programmed to data state S5).

In step 970, the system performs verification for data state S6. For example, the system tests whether memory cells being programmed to data state S6 have threshold voltages greater than Vv6 (e.g., applying verify voltage pulse v6 of FIG. 11 to the control gates of memory cells being programmed to data state S6).

In step 972, the system performs verification for data state S7. For example, the system tests whether memory cells being programmed to data state S7 have threshold voltages greater than Vv7 (e.g., applying verify voltage pulse v7 of FIG. 11 to the control gates of memory cells being programmed to data state S7). Note that, in one embodiment, steps 960-972 are performed between doses of programming (e.g., between programming voltage pulses). In some embodiments, one or more of steps 960-972 can be skipped between certain programming voltage pulses. In one embodiment, steps 960-972 are performed sequentially (in any order or in the order depicted), while in other embodiments steps 960-972 are performed in parallel (e.g., concurrently).

The flow of FIG. 12 illustrates the verification of all of the target data states, but to speed up the verification phase of a programming operation a "smart verify" operation can be used. In a smart verify, not all of the target data state levels are checked. Initially, for the first few programming pulses, only the lower data states need to be checked. As the programming operation continues, as the lower target data states begin to verify, additional higher data states are included; and, as the lower states finish, the lower target state verifies can be dropped out.

Returning to the 3D NAND structure of FIGS. 5-6E, in some embodiments of the vertical NAND structure a block can be made up of several fingers, such as the two fingers illustrated in FIG. 5. In some embodiments, these fingers can be individually selected for memory operations. FIG. 6E, the fingers, or sub-blocks, are individually selectable by their separate drain side select gates SGD at the top of the structure, allowing each finger to operate separately. FIG. 6E also includes separated source side select gates SGS at the bottom of the memory holes for each finger; however, such structurally separation can be difficult to implement because of processing difficulty in creating this separation at the bottom of the 3D structure. If SGS separation were available, the memory structure could achieve cell characteristics improvement, including read disturb reduction, power consumption reduction and faster operation. The following presents SGS separation by electrical methods using word lines. The situation can be described further with respect to FIG. 13A.

Figure 13A:
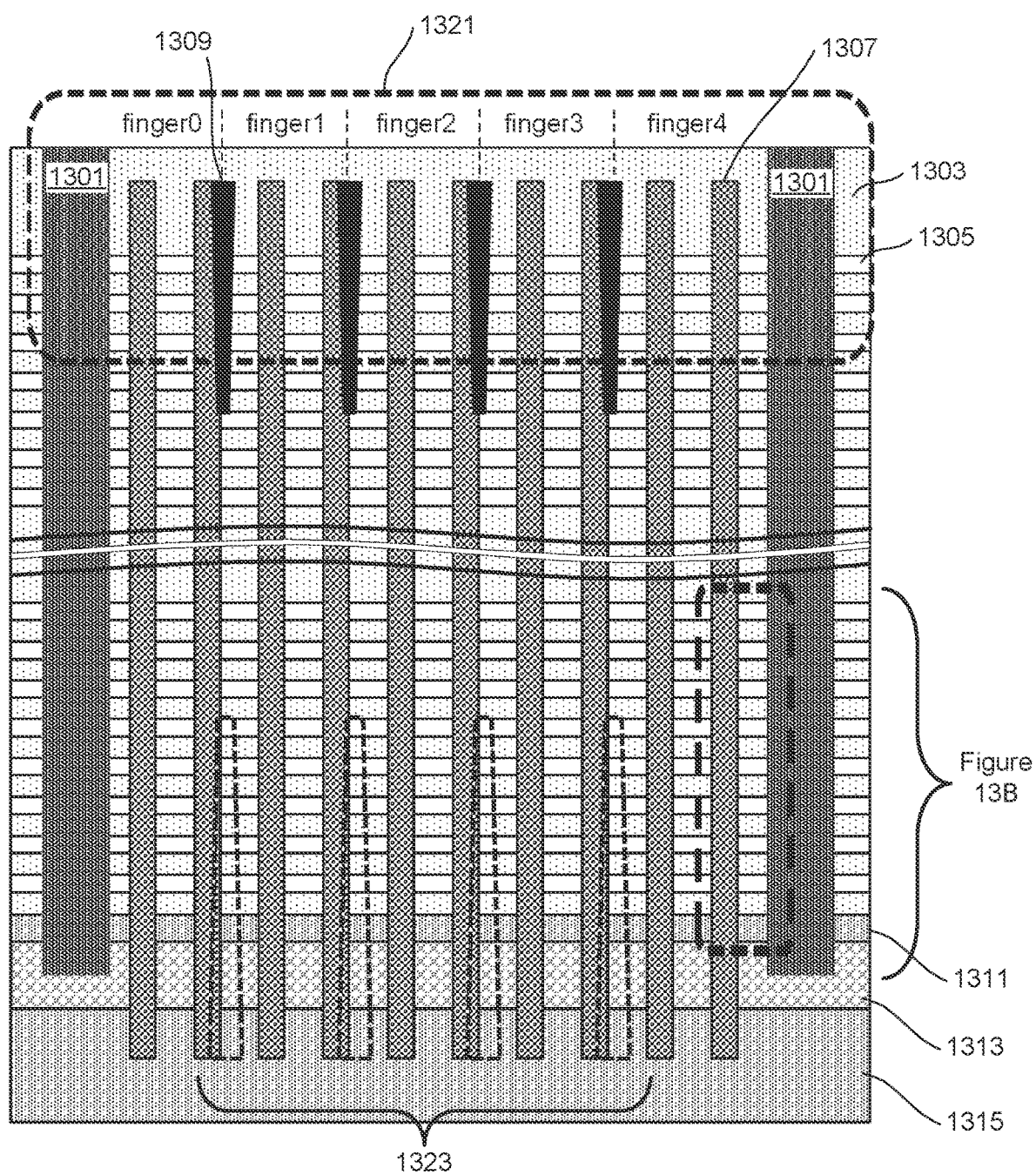
FIGS. 13A and 13B illustrates a side view of an embodiment for a block of a 3D NAND memory having five fingers.

FIG. 13A illustrates a side view of an embodiment for a block of a 3D NAND memory having five fingers. The structures outlined in heavy broken lines are not part of the structure, but are for reference in the following discussion. FIG. 13A shows some of the elements described in more detail with respect to FIGS. 5-6E that are of relevance to the following embodiments. Memory holes 1307 extend through alternating dielectric layers 1303 and conducting layers (including word lines and select lines) 1305 to a source line region 1313 between dielectric layers 1311 and 1315. The upper most and lower most of the conducting layers 1305 respectively are for the drain side and source side select gates. The memory holes of the block are between a pair of local interconnects 1301 and are, in this embodiment, separated into fiver fingers (finger0, finger1, finger2, finger3, finger 5) that are separated by the non-conducting separators 1309, so that the upper conductive layers within the outlined region 1321 can function as separated drain side select gates SGDs. This allows each finger to work individually during cell operation.

Figure 13B:
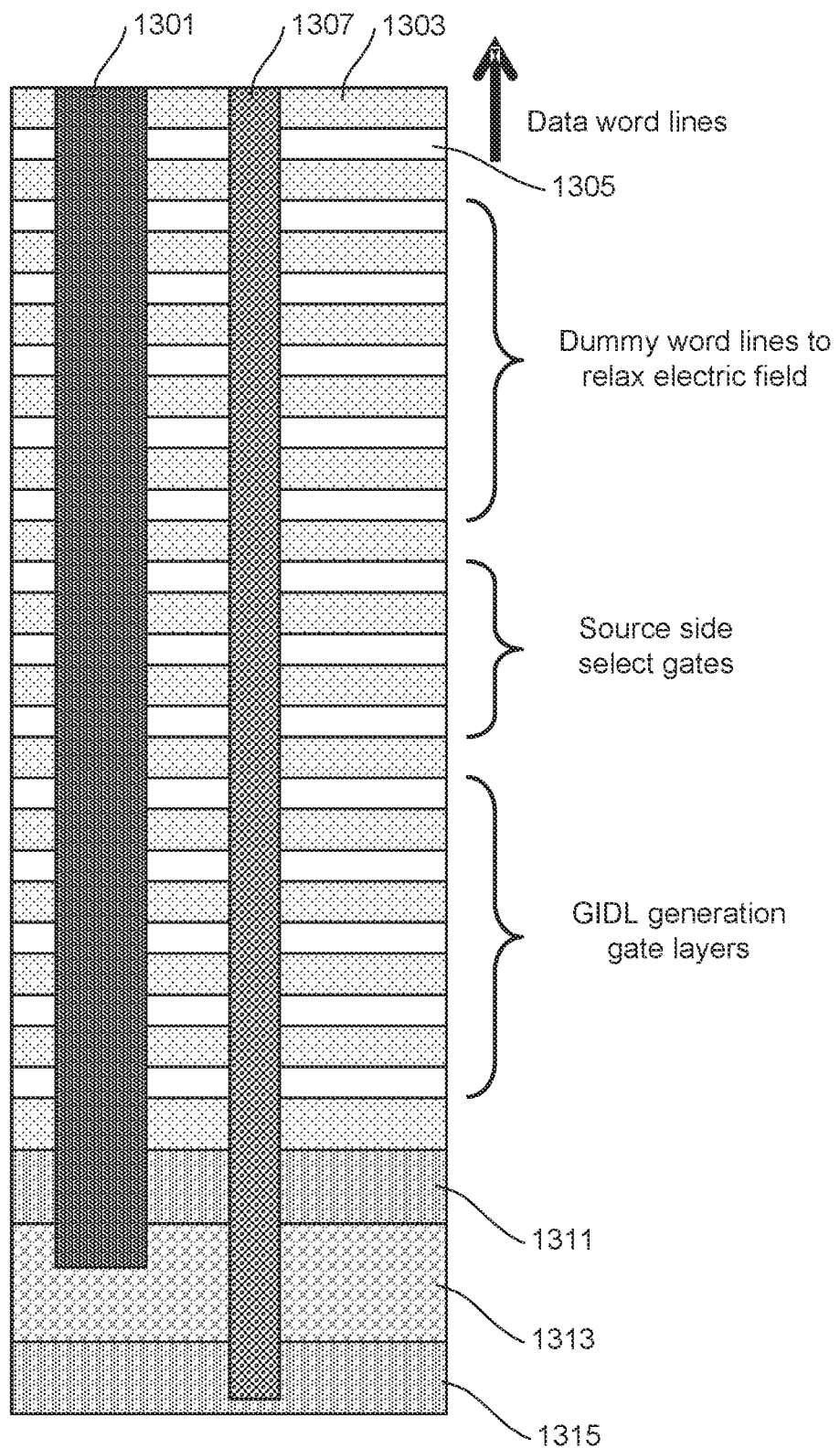

FIG. 13B is a detail of the region at bottom right of FIG. 13A outlined in the heavy broken line. At top, the uppermost conducting line (with the reference number) 1305 is the lower most data word line, below which this embodiment includes several dummy word lines to relax electric filed from the under lying source side select gate and reduce disturbs to the lower data word lines. Below the dummy word lines are the source side select gates, which in turn are over several GIDL layers. Both dummy word lines and the GIDL mechanism are discussed in more detail above with respect to FIGS. 5-6E. The number of these different type of lines that are included, and whether dummy word lines and GIDL generation gate layers are included, varies based on the embodiment.

Figure 14:
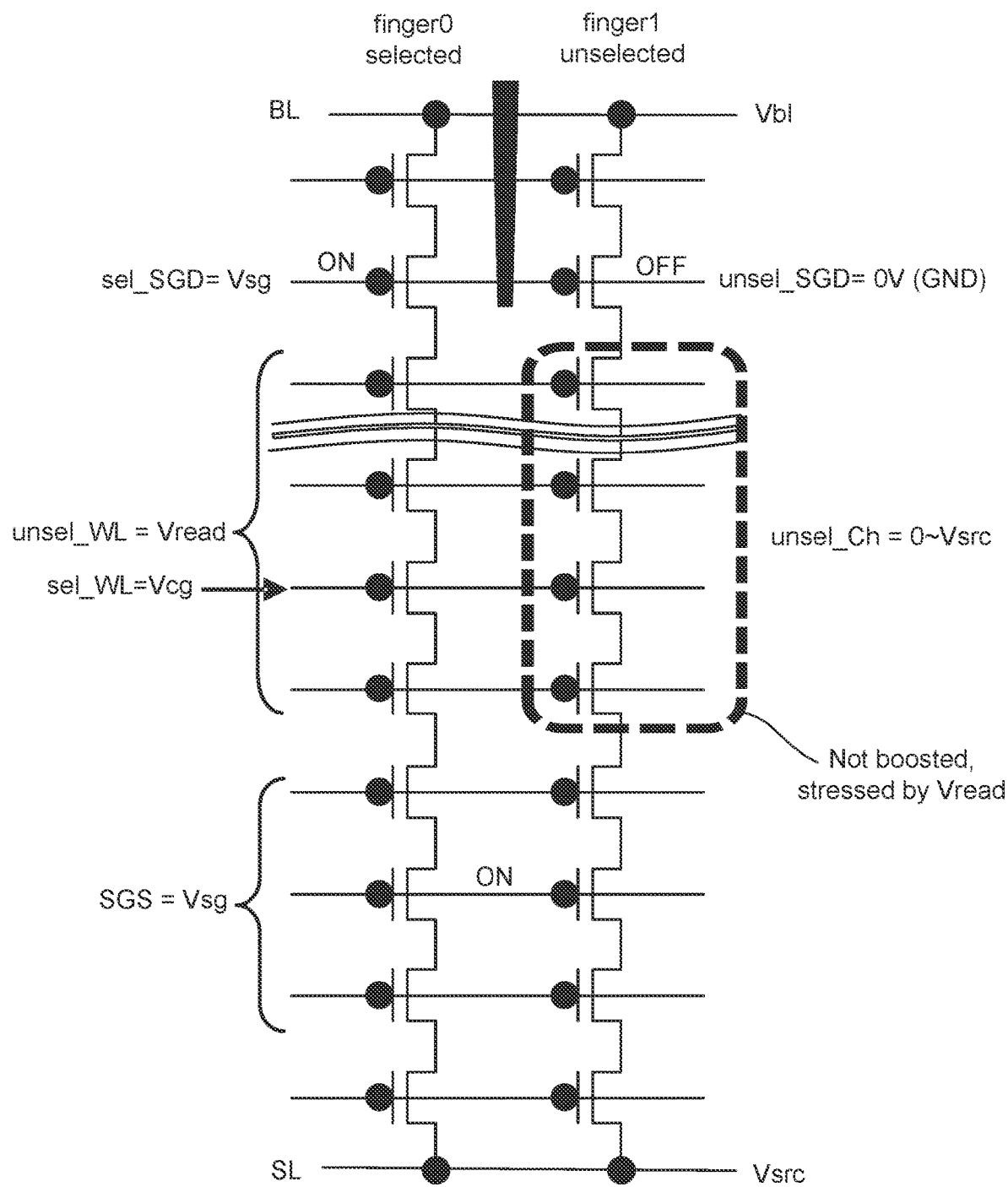
FIG. 14 illustrates voltage levels for a read operation on two fingers of a NAND memory that are individually selectable on the drain side, but are not individually selectable on the source side.

Returning to FIG. 13A, similar to the drain side select gate separators 1309, 1323 indicates, in heavy broken lines, where a similar set of SGS separators could be located. Although the SGD separators 1309 are relatively practical to form at the top of the 3D structure, forming SGS separators 1323 are typically not formed because processing difficulty for doing this at the bottom of the 3D structure. Consequently, the source side select gates cannot be operated separately for each finger, but only at the block level. This inability to individually select the fingers at the source side leads to increased disturb, increased word line capacitance, operation delay, and higher power consumption, issues that are aggravated as the stack height of the 3D NAND structure increase. FIG. 14 illustrates some of these issues.

FIG. 14 illustrates voltage levels for a read operation on two fingers of a NAND memory that are individually selectable on the drain side, but are not individually selectable on the source side. In a read operation, a selected bit line BL at top is set to a bit line voltage by a sense amplifier and. A NAND string in finger0 at left is selected for the read, while finger1 at right is unselected. The corresponding drain side select gate bias levels are shown on the second control line, with the drain side select gate of figure0 biased ON by the select voltage sel_SGD=Vsg and the drain side select gate of figure1 biased OFF by the unselect voltage unsel_SGD=0V (ground). On the source end, the source line SL is at a corresponding source voltage Vsrc. The source side select gates, for both finger0 and finger1, are biased at SGS=Vsg and ON. The word lines are biased for a read operation, with the selected word line at sel_WL=Vcg, which could be one of the read or verify voltages as discussed above with respect to FIGS. 7A-7C, and the unslected word lines at the read bypass voltage of unsel_WL=Vread. This allows for a read of selected word line in figure0 based on the amount of discharge from the bit line to the source line. In finger1, as SGS is on, the voltage on the unselected channel under the word lines is at unsel_CH=0~Vsrc, so the channel is not boosted and stress by the Vread voltage, which can lead to disturb.

To overcome this problem and provide finger separation at the source end while avoiding the processing difficulties of SGS separation, the following introduces word line based selectors, which can realize read disturb reduction, reduced power consumption, and increased operation speed. This structure can be illustrated with respect to the embodiment of FIG. 15.

Figure 15:
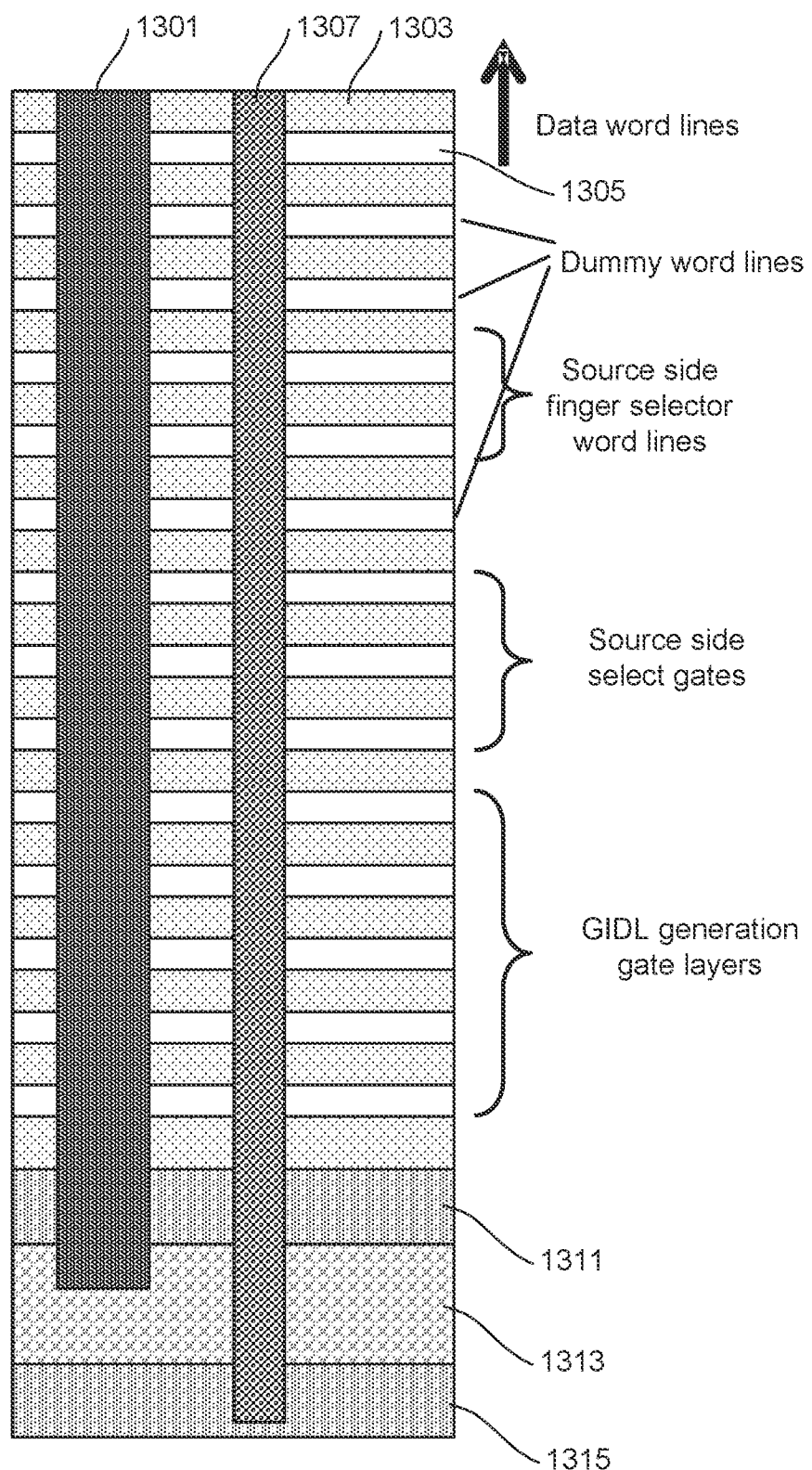
FIG. 15 is a detail of a 3D NAND structure, similar to that of FIG. 13B, but incorporating finger selector word lines.

FIG. 15 is a detail of a 3D NAND structure, similar to that of FIG. 13B, but incorporating finger selector word lines. As with FIG. 13B, FIG. 15 again includes the bottom-most data word line, dummy word lines, source side select gates, and GIDL generation gate layers. Relative to FIG. 13B, multiple finger selector word lines for the source side have now been added. By programming these finger selector word lines with different threshold voltages for the different figures, separation of the different fingers at the source can be effected. These embodiments make source side separation possible electrically by these additional layers to select source side fingers through their threshold voltages and bias voltage settings, resulting in read disturb reduction, power consumption reduction, and operation speed up. To provide the new layers to select fingers from the SGS side, a few dummy word line layers can be diverted from this purpose, with some additional layers added if needed. Although these source side finger selector lines provide a select function, the example embodiments presented here still include source side select gate to boost unselected fingers during the program operation for the source side finger selector lines.

Figure 16:
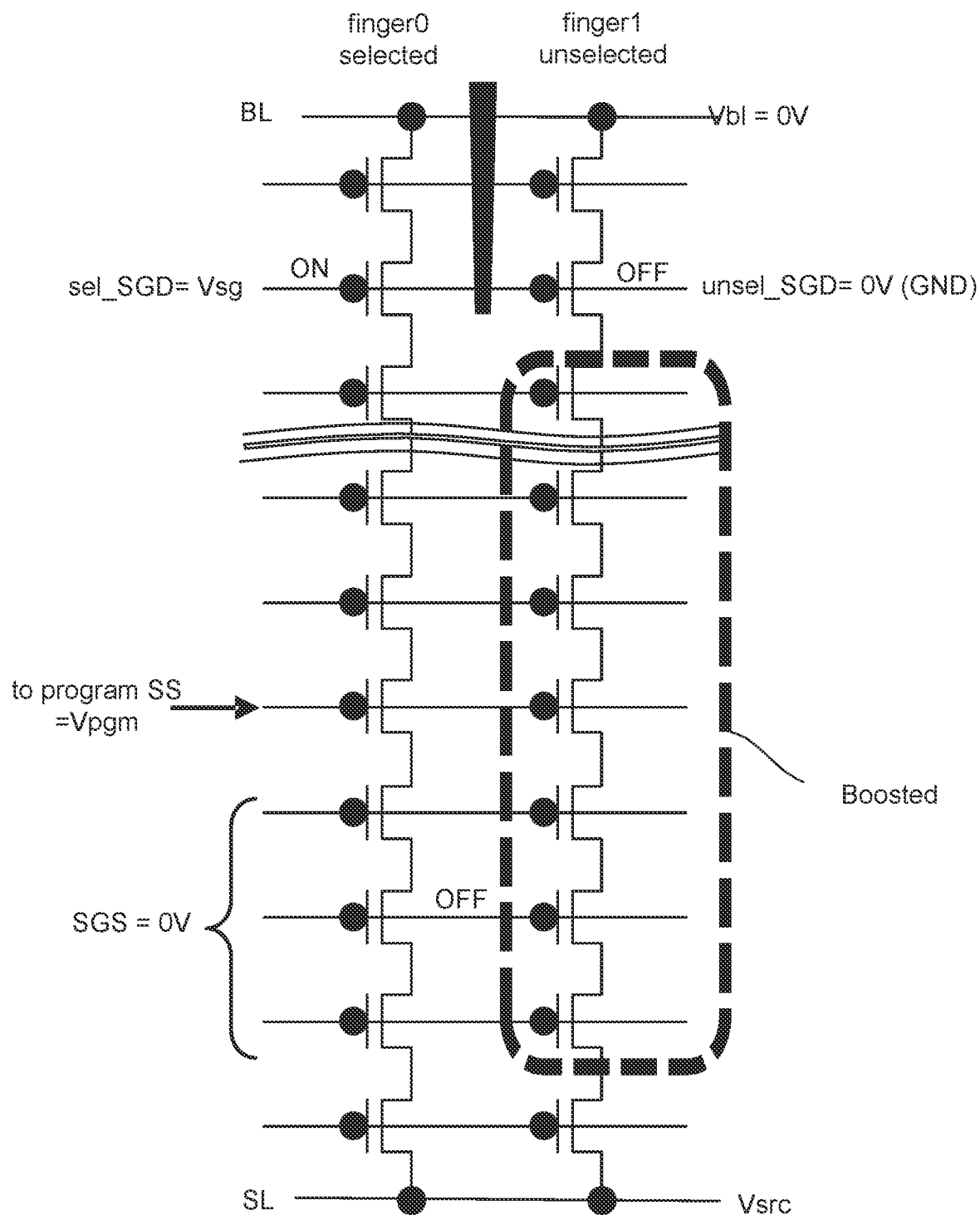
FIGS. 16 and 17 respectively illustrate the programming of the source side finger select word lines and a read operation with source side separated fingers using the programmed source side finger select word lines.
Figure 17:
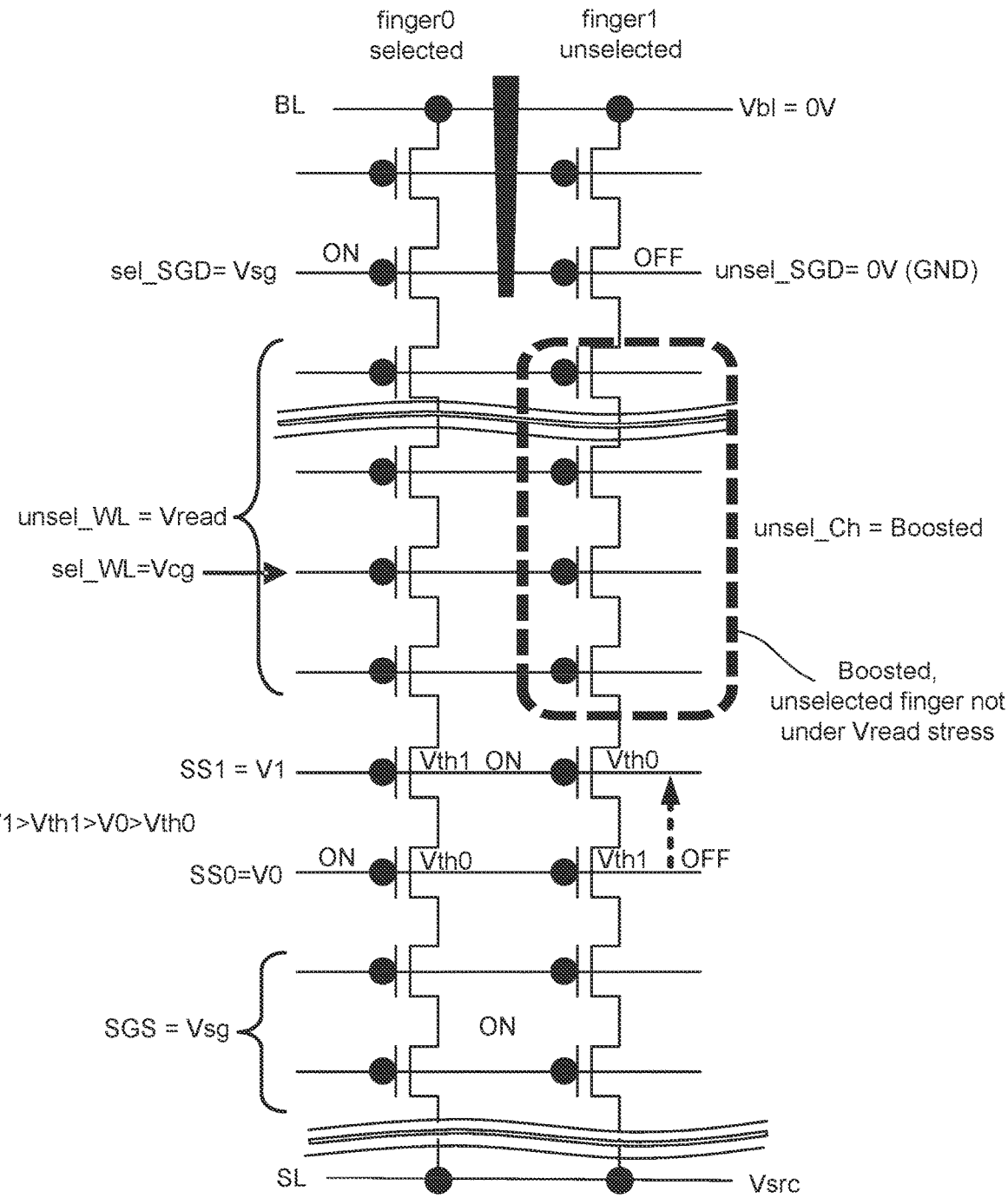

FIGS. 16 and 17 respectively illustrate the programming of the source side finger select word lines and a read operation with source side separated fingers using the programmed source side finger select word lines. In the embodiments described below with respect o FIGS. 18-21, the memory cells of the different fingers along the source side finger select word lines are programmed to different sets of threshold voltages to allow for the fingers to be individually selected at the source end. FIGS. 16 and 17 are laid out similarly to FIG. 14, but now include source side finger select (SS) word lines.

FIG. 16 illustrates the programming of a selected source side finger select word line SS in figure0. On selected finger0 for the drain side select gates, these are biased at sel_SGD=Vsg and are ON, so that the NAND cells are connected to receive the program enable bit line voltage. On the source side, SGS=0V, so that the source side select gates are all OFF. To program a selected source side finger select word line SS, the programming voltage Vpgm is applied in a programming operation as described above, with the unselected word lines (data and non-data, including other source side finger select word lines) at the program bypass voltage Vpass. For the unselected finger1, the drain side select gates are at unsel_SGD=0V and, consequently OFF, as well as being OFF at the source side so that the channel is boosted and not programmed.

FIG. 17 illustrates the read process using source side separation provided by the source side finger select word lines. FIG. 17 repeats the elements of FIG. 14 with the same bias levels, but now also adds the source side finger select word lines SS1 and SS2 to provide source side separated read. In this two finger, two source side finger select word line example, each source side finger select word line SS is either programmed to a threshold voltage Vth1 or Vth0, where Vth1>Vth0 and these threshold voltages are reversed between SS1 and SS2. In the example of FIG. 17, along SS1 in finger0 the memory cell is set at Vth1 and in finger1 the memory cell is set at Vth0; and along SS0 in finger0 the memory cell is set at Vth0 and in finger1 the memory cell is set at Vth1. The word lines are then biased by V1 or V0, where V1>Vth1>V0>Vth0. By setting SS1=V1, both memory cells along SS1 are ON; but by setting SS0=V0, the memory cell on word line SS0 for finger0 is ON, but the memory cell on word line SS1 for finger1 is OFF. As the NAND string in finger1 is cut off on both ends, the unselected channel is boosted so that the memory cells are not under Vread stress and less likely to be disturbed. FIGS. 18 and 19 and FIGS. 20 and 21 present two sets of embodiments for threshold voltages and bias voltages for source side finger select word lines.

Figure 18:
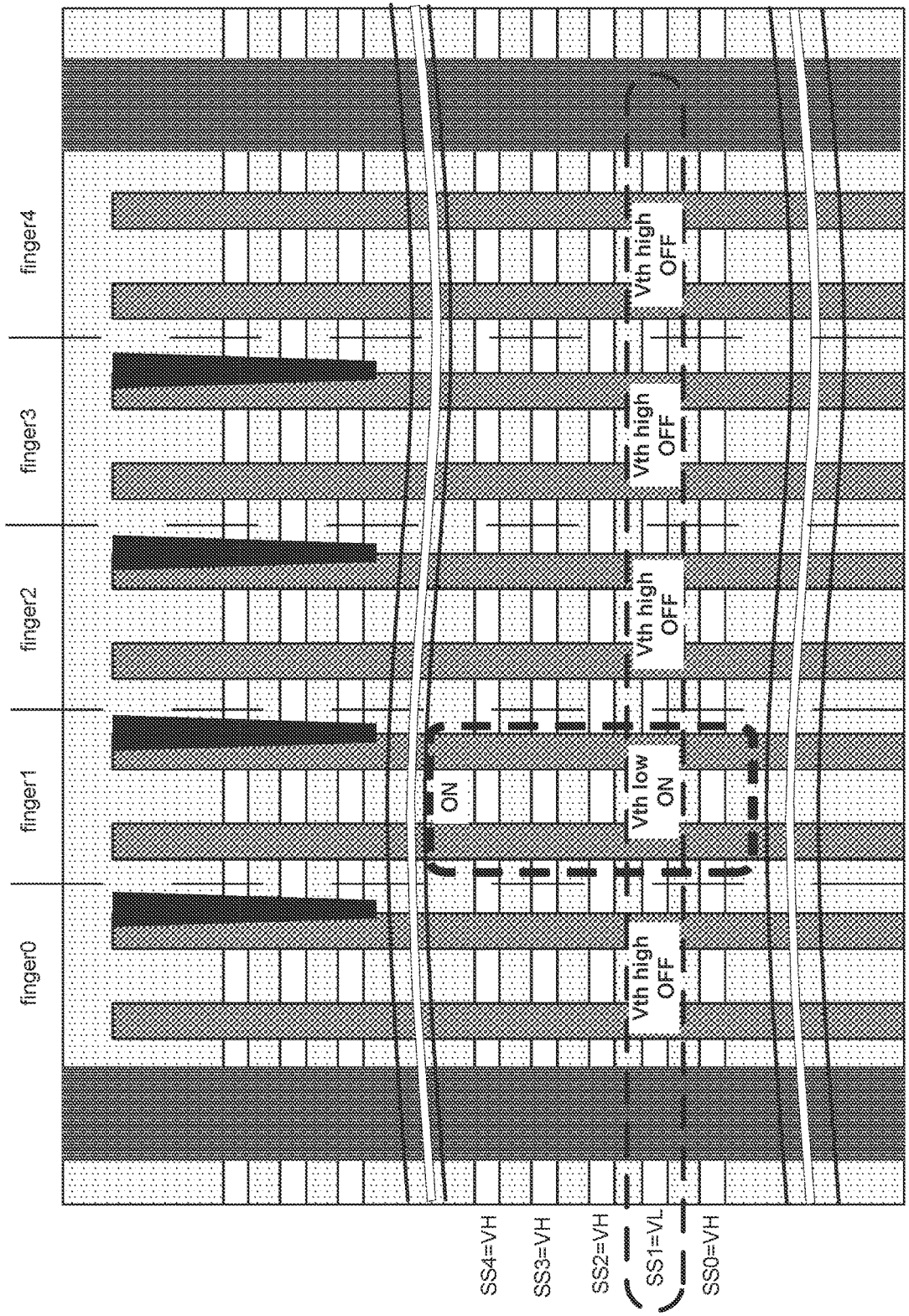

FIGS. 18 and 19 illustrate embodiments using a single level source side finger select word lines for source side separation of finger biasing. In these embodiments, for finger a single level source side finger select word line is assigned to each finger, with a low threshold voltage Vth_low programmed into the memory cells of the word line for the corresponding finger and a high threshold voltage Vth_high programmed in the memory cells of the word line corresponding to the other fingers. By using a high bias voltage VH and a low bias voltage VL, where VH>Vth_high>VL>Vth_low, by applying VL to Vt_low for the of the source side finger select word line corresponding to the finger to be selected and VH to the others, only that finger can be turned on. Figure illustrates this for when finger1 is selected.

FIG. 18 shows an abbreviated portion of FIG. 13A to illustrate the inclusion of source side finger select word lines SS0-SS4 into the structure. These source side finger select word lines SS0-SS4 are on the source side of the data word lines and, in the example embodiment here, are between the source side dummy word lines as illustrated in FIG. 15. Each of SS0-SS4 has memory cells in respective finger finger0-finger4 programmed to Vth_low, and the memory cells in the other fingers programmed to Vth_high. By biasing each of SS0 and SS2-SS4 to VH, these word lines are all ON; but by biasing SS1 to VL, only finger1 is ON, with the other fingers OFF. Consequently, this provides a source side select mechanism based on word lines.

FIG. 19 is a table of the SS Vth values and bias values to select a single finger of the NAND structure. For each source side finger select word lines SS0-SS4, the memory cells of the corresponding figure are programmed to Vth_low (as bolded in the stippled blocks), while those of the other fingers are programmed to Vth_high. To select a given finger, the corresponding SS0-SS4 is biased to VL (as bolded in the stippled blocks), while those of the other blocks are set to VH. FIGS. 18 and 19 are presented with a single word line corresponding to each finger, but, more generally, this could be a set of one or more word lines for each finger if multiple word lines are needed to effect the selection. Also, although the assignment source side finger select word lines to the word lines is shown as being diagonal, other orders can be used.

In the embodiment of FIGS. 18 and 19, the use of single level programming to either Vth_high or Vth_low for the threshold voltage of each SS cell allows for applying VL to Vt_low of the finger to be selected so that only the intended finger is turned on. As these embodiments only need binary Vth levels, they can be quite stable. Relative to the embodiments of FIGS. 20 and 21, the embodiments of FIGS. 18 and 19 use a SS layer for each of the fingers.

Figure 20:
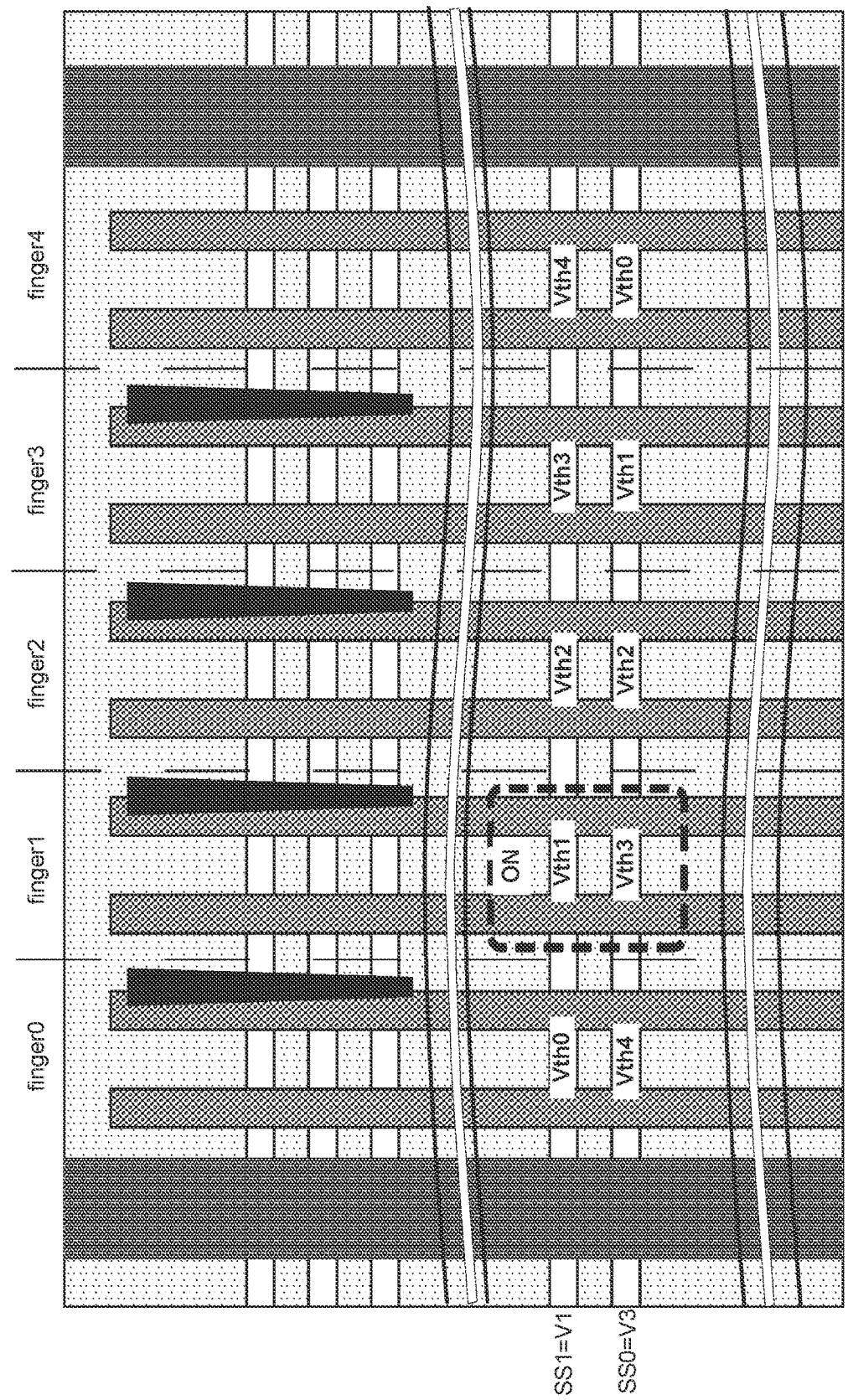

FIGS. 20 and 21 illustrate embodiments using multi-level source side finger select word lines for source side separation of finger biasing. In this embodiment, the multi-level cells for source side finger select word lines use as many states as there are fingers, with a different threshold voltage assigned to each of the fingers. This is done for each of two word lines (or sets of word lines, if needed for completely closing off unselected fingers), but with the thresholds arranged differently along the two word lines. By applying a pair different of bias voltages to the pair of word lines, an individual finger can be selectively turned on, where the number of bias voltages is also the same as the number of fingers. For the 5 finger example, the bias voltages (V0, V1, V2, V3, V4) and threshold voltages (Vth0, Vth1, Vth2, Vth3, Vth4) are arranged as: V4>Vth4>V3>Vth3>V2>Vth2>V1>Vth1>V0>Vth0. The threshold voltages on the two finger select word lines are then paired as highest with lowest, second highest with second lowest, and so on. (For the case of two fingers, this embodiment reduces to the embodiment of FIGS. 18 and 19.) FIG. 20 illustrates an example.

FIG. 20 is laid out similarly to FIG. 18, but now with only two finger select word lines, SS1 and SS0. In this example on SS1, the memory cells of finger0 are programmed to Vth0, those of finger1 to Vth1, those of finger2 to Vth2, those of finger3 to Vth3, and those of finger4 to Vth4. On SS0, these are arranged in reverse order, starting with Vth4 on finger 0. To select finger1, for example, SS1 is biased at V1, so that SS1 is ON for finger0 and finger1, but OFF for the other fingers; and SS0 is biased at V3 and so OFF for finger0 and ON for the others. It is only finger1 for which both of SS0 and SS1 are ON, with either one or the other being OFF in all other fingers.

The table of FIG. 21 illustrates the finger selection biasing for the 5 finger case. In FIG. 21, the bolded threshold voltages correspond to being ON for the SS bias voltage. In each case, there is only a pair of bias voltages for each finger in which both SS0 and SS1 are on, as marked by the stippling. More generally, for N+1 fingers, the threshold voltages are paired (Vth0, VthN), (Vth1, Vth(N−1)), . . . , (VthN, Vth0) and the corresponding select bias voltages are paired (V0, VN), (V1, V(N−1)), . . . , (VN, V0). The example of FIGS. 20 and 21 uses a "diagonal" arrangement of these pairing, but other embodiments can use differing orders as long as the pairings are maintained.

Relative to the embodiment of FIGS. 18 and 19, the embodiment of FIGS. 20 and 21 only needs two SS layers, allowing for a relative increase in the number of data word lines Data WL will be possible compared to the single level SS method. In many implementations, however, the method of FIGS. 20 and 21 may require multiple layers for each of SS0 and SS1 for Vth reliability. The embodiment of FIGS. 20 and 21 has the relative disadvantage in that it requires threshold voltage levels as there are fingers.

Figure 22:
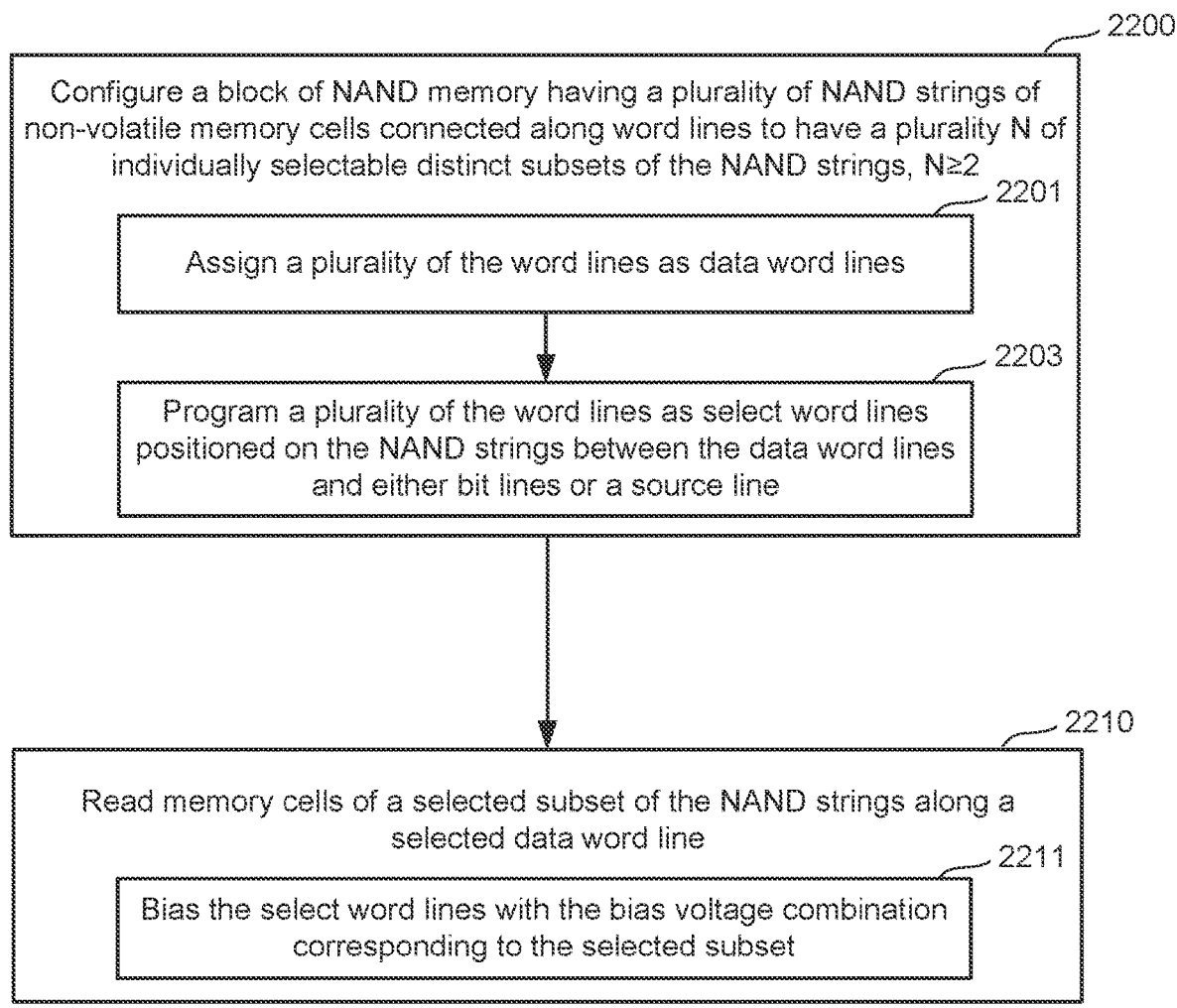
FIG. 22 is a flowchart of an embodiment for configuring a NAND memory array to use word line based selection of subsets of a block of NAND strings.

FIG. 22 is a flowchart of an embodiment for configuring a NAND memory array to use word line based selection of subsets of a block of NAND strings. The flow begins at step 2200 with the configuring of a NAND memory device so that the blocks have N individually selectable distinct subsets of the NAND strings for N≥2. In the finger-based 3D NAND structure presented above with respect to FIGS. 5-6E, these subsets have been presented as corresponding to the fingers of the structure, but more generally these can be other distinct subsets of the NAND strings in each of the blocks and, in some cases, are referred to as sub-blocks. The configuring can include, at step 2201, assigning the word lines to be either data word lines or non-data word lines, which can include dummy word lines as well as select word lines. (Here word lines are control lines than span the whole of a block and have connected therealong programmable threshold transistors (e.g., memory cells).) In the embodiments described above, the select word lines are located along the NAND strings between the data word lines and the source line, but could alternately or additionally be located between the data word lines and the bit lines.

In step 2203, select word lines are programmed such that each of the select word lines corresponds to one of a distinct sets of threshold value combinations to select one of N distinct subsets of the NAND strings in response to a corresponding one of a set of N distinct bias voltage combinations. The programming of the select word lines can, for example, be performed as part of the initial configuration process of a memory device before it is shipped, such as when the select gates are also programmed. Depending on the embodiment, the programming of the select word lines can be performed by the control circuitry of memory die 300 (FIG. 3A) or control die 311 (FIG. 3B), although in other embodiments this programming can be performed by external programming circuitry, such as when, for example, a memory die 301 is configured prior to bonding with a control die 311 in the embodiments described above with respect to FIG. 3B. In some embodiments, the select word lines can be subsequently reprogrammed in response to a special control sequence. The programming of the select word lines can, depending on the embodiment, be based on the embodiments presented above with either of FIGS. 18 and 19 or FIGS. 20 and 21.

Once the memory device is configured, the blocks of the memory array can be accessed for read, write, and erase as described above with respect to FIGS. 7A-12, where the select word lines can be used for finger level selection. For the read example, subsequent to programming data word lines, one or more memory cells of a selected subset of the NAND strings along a selected data word line can be read at step 2210. The read process can include, at step 2211, the biasing the select word lines by the row control circuitry 320 with the bias voltage combination corresponding to the selected subset, as well as the standard NAND read process of biasing the selected data word line to a sensing voltage and biasing data word lines other than the selected data word lines to a read bypass voltage.

The preceding discussion of using word lines to provide selection at the sub-block level have been presented with respect to a specific set of embodiments, but it will be understood that these techniques are more generally applicable. For example, the technique can be applied on the drain side of the NAND strings in addition to or instead of being used on the source side. Also, as described as being used in conjunction with select gates (and dummy word lines and GIDL generating layers), word line based select gates can be used without any of these additional layers.

The preceding description has also focused on a 3D NAND structure including block having a finger sub-structure, but more generally the techniques can be applied to other subsets of the NAND strings in a NAND memory, whether in a 2D or a 3D embodiment. Further, although the discussion of either of FIGS. 18 and 19 or FIGS. 20 and 21 described a single select word line for each combination of threshold voltage levels, in some embodiments multiple select word lines can be used for each combination to provide more robust operation.

One embodiment includes a non-volatile memory device comprising an array of non-volatile memory cells comprising a plurality of blocks, each of the blocks having a NAND architecture. The array includes: a source line; a plurality of bit lines; a plurality of NAND strings each comprising a plurality of memory cells connected in series between the source line and a corresponding bit line; and a plurality of word lines along each of which is connected a corresponding memory cell of each of the NAND strings. The word lines include: a plurality of data word lines; and a plurality of select word lines positioned on the NAND strings between the data word lines and either the bit lines or the source line, each of the plurality of select word lines programmed to one of a distinct sets of threshold value combinations to select one of N distinct subsets of the NAND strings in response to a corresponding one of a set of N distinct bias voltage combinations, where N is an integer greater than or equal to two.

One embodiment includes a method comprising: configuring a block of NAND memory having a plurality of NAND strings of non-volatile memory cells connected along word lines to have a plurality N of individually selectable distinct subsets of the NAND strings, where N is an integer greater than or equal to two. The configuring comprises: assigning a plurality of the word lines as data word lines; and programming a plurality of the word lines as select word lines, the select word lines positioned on the NAND strings between the data word lines and either bit lines or a source line between which the NAND strings are connected, comprising: programming each of the select word lines to one of a distinct sets of threshold value combinations to select one of N distinct subsets of the NAND strings in response to a corresponding one of a set of N distinct bias voltage combinations.

One embodiment includes a non-volatile memory device, comprising a control circuit configured to connect to an array of non-volatile memory cells, including a block of a plurality of NAND strings each comprising a plurality of memory cells connected in series between the source line and a corresponding bit line connected along word lines. The control circuit is configured to: write data to, and read data from, a plurality of data word lines of the block; and prior to writing data to, and reading data from, the plurality of data word lines of the block, program a plurality of select word lines positioned on the NAND strings of the block between the data word lines and either the bit lines or the source line, each of the plurality of select word lines programmed to one of a distinct sets of threshold value combinations to select one of N distinct subsets of the NAND strings in response to a corresponding one of a set of N distinct bias voltage combinations, where N is an integer greater than or equal to two.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
   an array of non-volatile memory cells comprising a plurality of blocks, each of the blocks having a NAND architecture and comprising:
   a source line;
   a plurality of bit lines;
   a plurality of NAND strings each comprising a plurality of memory cells connected in series between the source line and a corresponding bit line; and
   a plurality of word lines along each of which is connected a corresponding memory cell of each of the NAND strings, the word lines including:
   a plurality of data word lines; and
   a plurality of select word lines positioned on the NAND strings between the data word lines and either the bit lines or the source line, each of the plurality of select word lines programmed to one of a distinct sets of threshold value combinations to select one of N distinct subsets of the NAND strings in response to a corresponding one of a set of N distinct bias voltage combinations, where N is an integer greater than or equal to two.

2. The non-volatile memory device of claim 1, wherein the plurality of select word lines comprise a select word line corresponding to each of the N distinct subsets of the NAND strings, where the memory cells along the word line corresponding to the each of the N distinct subsets of the NAND strings are programmed to a low threshold voltage for the corresponding subset and programmed to a high threshold voltage for subsets other than the corresponding subset.

3. The non-volatile memory device of claim 1, wherein the plurality of select word lines comprise:

a first select word line, the memory cells along the first select word corresponding to each of the N distinct subsets of the NAND strings are programmed to different one of N distinct threshold voltage values; and
a second select word line, the memory cells along the first select word corresponding to each of the N distinct subsets of the NAND strings are programmed to different one of the N distinct threshold voltage values, wherein each of the subsets has a different combination of the N distinct threshold voltage values on the first select word line and second select word line.

4. The non-volatile memory device of claim 1, wherein the plurality of select word lines are positioned between the data word lines and the source line.

5. The non-volatile memory device of claim 4, wherein each of the NAND strings further comprise:
   one or more source side select transistors connected between the source line and the memory cells connected to the select word lines.

6. The non-volatile memory device of claim 5, wherein each of the NAND strings further comprise:
   one or more transistors configured to generate gate induced drain leakage (GIDL) current connected between the source side select transistors and the source line.

7. The non-volatile memory device of claim 5, wherein each of the NAND strings further comprise:
   one or more drain side select transistors connected between the bit line and the memory cells.

8. The non-volatile memory device of claim 5, wherein the plurality of word lines further comprise:
   one or more dummy word lines positioned on the NAND strings between the data word lines and the select word lines; and
   one or more dummy word lines positioned on the NAND strings between the select word lines and the source side select transistors.

9. The non-volatile memory device of claim 1, wherein array has a three dimensional structure in which the NAND string extends vertically above a substrate and the word lines run horizontally across the substrate.

10. The non-volatile memory device of claim 1, further comprising:
    one or more control circuits connected to the array and configured to read one or more memory cells of a selected subset of the NAND strings along a selected data word line, where, to read the one or more memory cells, the one or more control circuits are configured to concurrently:
    bias the select word lines with the bias voltage combination corresponding to the selected subset;
    bias the selected data word line to a sensing voltage; and
    bias data word lines other than the selected data word lines to a read bypass voltage.

11. The non-volatile memory device of claim 10, wherein the one or more control circuits are further configured to program the selected word lines to the distinct sets of threshold value.

12. A method, comprising:
    configuring a block of NAND memory having a plurality of NAND strings of non-volatile memory cells connected along word lines to have a plurality N of individually selectable distinct subsets of the NAND strings, where N is an integer greater than or equal to two, the configuring comprising:

assigning a plurality of the word lines as data word lines; and programming a plurality of the word lines as select word lines, the select word lines positioned on the NAND strings between the data word lines and either bit lines or a source line between which the NAND strings are connected, comprising:

programming each of the select word lines to one of a distinct sets of threshold value combinations to select one of N distinct subsets of the NAND strings in response to a corresponding one of a set of N distinct bias voltage combinations.

13. The method of claim 12, wherein the plurality of select word lines comprise a select word line corresponding to each of the N distinct subsets of the NAND strings, and programming the select word lines comprises:

programming the memory cells along the word line corresponding to the each of the N distinct subsets of the NAND strings to a low threshold voltage for the corresponding subset and programmed to a high threshold voltage for subsets other than the corresponding subset.

14. The method of claim 12, wherein programming the select word lines comprises:

programming the memory cells along a first select word corresponding to each of the N distinct subsets of the NAND strings to different one of N distinct threshold voltage values; and programming the memory cells along a second select word line corresponding to each of the N distinct subsets of the NAND strings are programmed to different one of the N distinct threshold voltage values, wherein each of the subsets has a different combination of the N distinct threshold voltage values on the first select word line and second select word line.

15. The method of claim 12, further comprising:

subsequent to programming the plurality of the word lines as select word lines, reading one or more memory cells of a selected subset of the NAND strings along a selected data word line, comprising:

biasing the select word lines with the bias voltage combination corresponding to the selected subset;

biasing the selected data word line to a sensing voltage; and biasing data word lines other than the selected data word lines to a read bypass voltage.

16. A non-volatile memory device, comprising:

a control circuit configured to connect to an array of non-volatile memory cells, including a block of a plurality of NAND strings each comprising a plurality of memory cells connected in series between the source line and a corresponding bit line connected along word lines, the control circuit is configured to:

write data to, and read data from, a plurality of data word lines of the block; and prior to writing data to, and reading data from, the plurality of data word lines of the block, program a plurality of select word lines positioned on the NAND strings of the block between the data word lines and either the bit lines or the source line, each of the plurality of select word lines programmed to one of a distinct sets of threshold value combinations to select one of N distinct subsets of the NAND strings in response to a corresponding one of a set of N distinct bias voltage combinations, where N is an integer greater than or equal to two.

17. The non-volatile memory device of claim 16, wherein the control circuit is formed on a control die, the non-volatile memory device further comprising:

a memory die including the array of non-volatile memory cells, the memory die separate from and bonded to the control die.

18. The non-volatile memory device of claim 16, wherein to program the plurality of select word lines the control circuit is further configured to:

program the memory cells along the word line corresponding to the each of the N distinct subsets of the NAND strings to a low threshold voltage for the corresponding subset and programmed to a high threshold voltage for subsets other than the corresponding subset.

19. The non-volatile memory device of claim 16, wherein to program the plurality of select word lines the control circuit is further configured to:

program the memory cells along a first select word corresponding to each of the N distinct subsets of the NAND strings to different one of N distinct threshold voltage values; and program the memory cells along a second select word line corresponding to each of the N distinct subsets of the NAND strings are programmed to different one of the N distinct threshold voltage values, wherein each of the subsets has a different combination of the N distinct threshold voltage values on the first select word line and second select word line.

20. The non-volatile memory device of claim 16, wherein to read memory cells of a selected subset of the NAND strings along a selected data word line the control circuit is further configured to:

bias the select word lines with the bias voltage combination corresponding to the selected subset;

bias the selected data word line to a sensing voltage; and bias data word lines other than the selected data word lines to a read bypass voltage.

* * * * *